US012444468B2

(12) United States Patent
Choo et al.

(10) Patent No.: US 12,444,468 B2
(45) Date of Patent: Oct. 14, 2025

(54) MEMORY DEVICE HAVING ASYMMETRIC PAGE BUFFER ARRAY ARCHITECTURE

(71) Applicant: SAMSUNG ELECTRONICS CO., LTD., Suwon-si (KR)

(72) Inventors: Gyosoo Choo, Suwon-si (KR); Daeseok Byeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 167 days.

(21) Appl. No.: 18/386,472

(22) Filed: Nov. 2, 2023

(65) Prior Publication Data
US 2024/0194265 A1 Jun. 13, 2024

(30) Foreign Application Priority Data

Dec. 13, 2022 (KR) .................. 10-2022-0174192
Mar. 28, 2023 (KR) .................. 10-2023-0040759

(51) Int. Cl.
G11C 16/04 (2006.01)
G11C 5/06 (2006.01)
G11C 16/08 (2006.01)
H10B 41/27 (2023.01)
H10B 41/35 (2023.01)
(Continued)

(52) U.S. Cl.
CPC .............. G11C 16/08 (2013.01); G11C 5/063 (2013.01); G11C 16/0483 (2013.01); H10B 41/27 (2023.02); H10B 41/35 (2023.02); H10B 41/40 (2023.02); H10B 43/27 (2023.02); H10B 43/35 (2023.02); H10B 43/40 (2023.02)

(58) Field of Classification Search
CPC ..... G11C 16/08; G11C 5/063; G11C 16/0483; G11C 8/14; G11C 16/24; G11C 5/025; G11C 7/18; H10B 41/27; H10B 41/35; H10B 41/40; H10B 43/27; H10B 43/35; H10B 43/40; H10B 43/50
USPC ...................................... 365/185.01
See application file for complete search history.

(56) References Cited

U.S. PATENT DOCUMENTS 9,111,597 B2   8/2015   Chen
9,941,009 B2   4/2018   Lim et al.
(Continued)

FOREIGN PATENT DOCUMENTS

KR    10-2271600 B1    7/2021

OTHER PUBLICATIONS

Extended European Search Report dated May 8, 2024, issued by the European Patent Office in European Application No. 23216176.0.

Primary Examiner — Tha-O H Bui
(74) Attorney, Agent, or Firm — Sughrue Mion, PLLC

(57) ABSTRACT

Memory devices having an asymmetric page buffer array architecture are provided. The memory device includes a memory cell array in which each of plural memory planes is included in a cell array structure, and a row decoder array and a page buffer array included in a peripheral circuit structure vertically overlap the cell array structure. The row decoder array is buried in a region vertically overlapping a word line step region of the cell array structure and a partial region of a memory cell array adjacent to the word line step region. In the page buffer array, bit lines of a partial region of the memory cell array in which the row decoder array is buried are connected to a first page buffer array, and bit lines not included in the partial region are connected to a second page buffer array.

20 Claims, 22 Drawing Sheets

(51) Int. Cl.
*H10B 41/40* (2023.01)
*H10B 43/27* (2023.01)
*H10B 43/35* (2023.01)
*H10B 43/40* (2023.01)

(56) References Cited

U.S. PATENT DOCUMENTS

| | | |
|---|---|---|
| 10,522,231 B2 * | 12/2019 | Noro .................... G11C 7/1048 |
| 10,804,293 B2 | 10/2020 | Park et al. |
| 11,177,005 B2 | 11/2021 | Oh |
| 11,380,702 B2 | 7/2022 | Kim et al. |
| 11,398,443 B2 | 7/2022 | Oh et al. |
| 11,488,672 B2 | 11/2022 | Oh |
| 11,657,858 B2 * | 5/2023 | Kim ....................... G11C 5/025 |
| | | 365/185.12 |
| 11,971,829 B2 * | 4/2024 | Hsu .................... G11C 16/0483 |
| 2020/0227398 A1 | 7/2020 | Oh et al. |
| 2022/0077088 A1 | 3/2022 | Okada et al. |

* cited by examiner

MEMORY DEVICE HAVING ASYMMETRIC PAGE BUFFER ARRAY ARCHITECTURE

CROSS-REFERENCE TO RELATED APPLICATION

This application is based on and claims priority under 35 U.S.C. § 119 to Korean Patent Application No. 10-2022-0174192, filed on Dec. 13, 2022, and Korean Patent Application No. 10-2023-0040759, filed on Mar. 28, 2023, in the Korean Intellectual Property Office, the disclosures of each of which being incorporated by reference herein in their entireties.

BACKGROUND

The present disclosure relates to semiconductor memory devices, and more particularly, to a memory device having an asymmetric page buffer array architecture to reduce the size of a memory chip.

As information communication devices become multi-functional, memory devices are required to have larger capacity and higher integration. As the sizes of memory cells are reduced for high integration, operating circuits and/or wiring structures included in the memory devices for operation and electrical connection of the memory devices become more complex. Accordingly, there is a demand for memory devices with improved integration and excellent electrical characteristics. In order to improve the storage capacity and integration of memory devices, non-volatile memory devices including memory cells stacked in a three-dimensional structure, such as three-dimensional NAND flash memory devices, have been developed.

In three-dimensional NAND flash memory devices, the number of word lines stacked on a substrate in the vertical direction may increase according to the trend of increasing the capacity of memory blocks. An area of a row decoder connected to word lines may increase according to the number of stacked word lines. The area of the row decoder is a major factor in determining the chip size of a three-dimensional NAND flash memory device. The length of a memory chip in the X direction is determined according to the size of a package in which the memory chip is mounted, for example, the length of the package in the X direction, and accordingly, the area of a row decoder may be limited. In this case, the number of stacked word lines may be limited by the limited area of a row decoder, which may cause disadvantages in that the capacity of a memory block is limited.

SUMMARY

It is an aspect to provide memory devices having an asymmetric page buffer array architecture that may reduce the size of a memory chip while not limiting the number of stacked word lines according to an increase in capacity of a memory block.

According to an aspect of one or more embodiments, a memory device may include a plurality of memory planes that each includes a memory cell array including a plurality of non-volatile memory cells, a row decoder array connected to the plurality of non-volatile memory cells included in the memory cell array through a plurality of word lines extending in a first horizontal direction, and a page buffer array connected to the plurality of non-volatile memory cells included in the memory cell array through a plurality of bit lines extending in a second horizontal direction crossing the first horizontal direction; a peripheral circuit structure including the row decoder array included in each of the plurality of memory planes and the page buffer array included in each of the plurality of memory planes; and a cell array structure on the peripheral circuit structure, the cell array structure overlapping the peripheral circuit structure in a vertical direction on the peripheral circuit structure, wherein the cell array structure includes the memory cell array of each of the plurality of memory planes, and a word line step region in which the plurality of word lines extend parallel to each other in the first horizontal direction and the second horizontal direction and overlap each other in the vertical direction, wherein, in each of the plurality of memory planes, the page buffer array is divided into a page buffer array connected to bit lines of a partial region of the memory cell array that overlaps a part of the row decoder array in the vertical direction and a page buffer array connected to other bit lines not included in the partial region.

According to another aspect of one or more embodiments, a memory device may include a plurality of memory planes that each include a memory cell array including a plurality of non-volatile memory cells, a row decoder array connected to the plurality of non-volatile memory cells included in the memory cell array through a plurality of word lines extending in a first horizontal direction, and a page buffer array connected to the plurality of non-volatile memory cells included in the memory cell array through a plurality of bit lines extending in a second horizontal direction crossing the first horizontal direction; a peripheral circuit structure including the row decoder array included in each of the plurality of memory planes and the page buffer array included in each of the plurality of memory planes, the row decoder array being on one edge of the peripheral circuit structure; and a cell array structure on the peripheral circuit structure, the cell array structure overlapping the peripheral circuit structure in a vertical direction on the peripheral circuit structure, wherein the cell array structure includes the memory cell array of each of the plurality of memory planes, and a word line step region in which the plurality of word lines extend parallel to each other in the first horizontal direction and the second horizontal direction and overlap each other in the vertical direction, wherein, in each of the plurality of memory planes, the page buffer array is divided into a page buffer array connected to bit lines of a partial region of the memory cell array that overlaps a part of the row decoder array in the vertical direction and a page buffer array connected to other bit lines not included in the partial region.

According to yet another aspect of one or more embodiments, a memory device may include a plurality of memory planes that each include a memory cell array including a plurality of non-volatile memory cells, a row decoder array connected to the plurality of non-volatile memory cells included in the memory cell array through a plurality of word lines extending in a first horizontal direction X, and a page buffer array connected to the plurality of non-volatile memory cells included in the memory cell array through a plurality of bit lines extending in a second horizontal direction Y crossing the first horizontal direction; a peripheral circuit structure including the row decoder array included in each of the plurality of memory planes and the page buffer array included in each of the plurality of memory planes, the row decoder array being on one edge of the peripheral circuit structure, and the page buffer array being on both sides of the peripheral circuit structure in the second horizontal direction; and a cell array structure on the peripheral circuit structure, the cell array structure overlapping the peripheral circuit structure in a vertical direction on the peripheral circuit structure, wherein the cell array structure includes the memory cell array of each of the plurality of memory planes, and a word line step region in which the plurality of word lines extend parallel to each other in the first horizontal direction and the second horizontal direction and overlap each other in the vertical direction, wherein, in each of the plurality of memory planes, the page buffer array is divided into a page buffer array connected to bit lines of a partial region of the memory cell array overlapping a part of the row decoder array in the vertical direction and a page buffer array connected to other bit lines not included in the partial region.

BRIEF DESCRIPTION OF THE DRAWINGS

Various embodiments will be more clearly understood from the following detailed description taken in conjunction with the accompanying drawings, in which.

DETAILED DESCRIPTION

Figure 1:
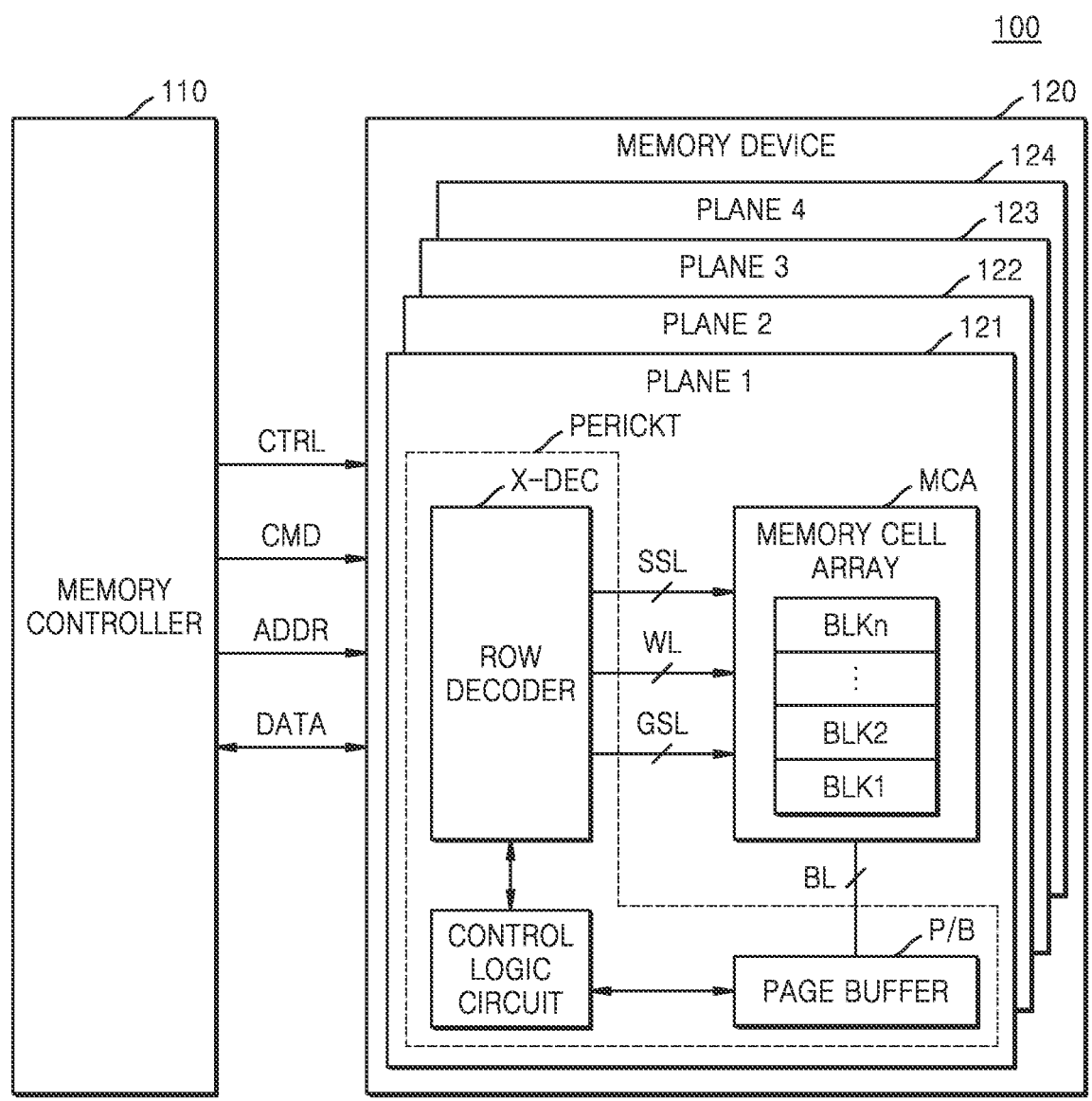
FIG. 1 is a block diagram illustrating a memory system including a memory device according to embodiments.

FIG. 1 is a block diagram illustrating a memory system including a memory device according to embodiments;

Referring to FIG. 1, a memory system 100 may include a memory controller 110 and at least one memory device 120. The memory system 100 may be included or mounted in electronic devices, such as personal computers, servers, data centers, smartphones, tablet personal computers (PCs), autonomous vehicles, portable game consoles, and wearable devices. For example, the memory system 100 may be implemented as a storage device, such as a solid state drive (SSD).

The memory controller 110 may control all operations of the memory device 120. The memory controller 110 may control the memory device 120 by providing a control signal CTRL, a command signal CMD, and/or an address signal ADDR to the memory device 120. In an embodiment, the memory controller 110 may control the memory device 120 to store data DATA or output the data DATA therein or therefrom in response to a request from an external host.

The memory device 120 may operate by the control of the memory controller 110. The memory device 120 may output the stored data DATA or may store the data DATA provided from the memory controller 110 under the control of the memory controller 110. The memory device 120 may be a non-volatile memory device, and hereinafter, the memory device 120 may be referred to as a non-volatile memory device.

The memory device 120 may include a first memory plane 121, a second memory plane 122, a third memory plane 123, and a fourth memory plane 124. In the embodiment, the memory device 120 is illustrated to have four memory planes but embodiments are not limited thereto and, in some embodiments, the memory device 120 may have various numbers (for example, 2, 6, or more) of the memory planes. The first to fourth memory planes 121 to 124 may operate independently of each other. According to an embodiment, the memory controller 110 may access the first to fourth memory planes 121 to 124 in parallel by logically connecting memory blocks respectively included in the first to fourth memory planes 121 to 124 to each other to improve parallel processing performance of the memory system 100. For example, data write and read may be performed in units of 32 KB to perform sequential write and read with high performance in a structure of 8 planes and a 4 KB page. When only 4 KB data is read or written, 4 KB random read and write may be performed by enabling only a preset memory plane. When more than 4 KB of data, e.g., 8 KB of data, is read or written, the sequential read and write of more than 4 KB of data, e.g., the 8 KB of data, may be performed by enabling plural memory planes. The memory device 120 may have a different internal configuration depending on whether a high bandwidth sequential read or write operation or a random read or write operation is performed according to system applications.

The first to fourth memory planes 121 to 124 may each include a memory cell array MCA and a peripheral circuit PERICKT, and the peripheral circuit PERICKT of each of the first to fourth memory planes 121 to 124 may include a row decoder array X-DEC and a page buffer array P/B. Although not illustrated, the peripheral circuit PERICKT of each of the first to fourth memory planes 121 to 124 may further include a voltage generator, a data input/output circuit, an input/output interface, a temperature sensor, a command decoder, and so on. The peripheral circuit PERICKT of each of the first to fourth memory planes 121 to 124 may further include a control logic circuit. The control logic circuit may generate various control signals for programming data into the memory cell array MCA, reading data from the memory cell array MCA, or erasing data stored in the memory cell array MCA based on the command signal CMD, the address signal ADDR, and the control signal CTRL. For example, the control logic circuit may output a row address signal and a column address signal. Accordingly, the control logic circuit may generally control various operations of the memory device 120. In the description that follows, the first memory plane 121 will be primarily described by way of example. It will be understood that the components of the other ones of the plurality of memory planes have a similar structure and operate in a similar manner as the first memory plane 121 such that the description that follows also applies to the other ones of the plurality of memory planes.

The memory cell array MCA may include a plurality of memory blocks BLK1 to BLKn (n is a positive integer). Each of the plurality of memory blocks BLK1 to BLKn may include a plurality of memory cells. The memory cell array MCA may be connected to the page buffer array P/B through bit lines BL or may be connected to the row decoder array X-DEC through word lines WL, string select lines SSL, and ground select lines GSL. A plurality of memory cells included in a plurality of memory blocks BLK1, BLK2, . . . , BLKn in the memory cell array MCA may be flash memory cells. Hereinafter, embodiments are described in detail by taking a case in which the plurality of memory cells are NAND flash memory cells as an example. However, embodiments are not limited thereto, and in some embodiments, the plurality of memory cells may be resistive memory cells, such as resistive RAM (ReRAM), phase change RAM (PRAM), or magnetic RAM (MRAM).

In some embodiments, the memory cell array MCA may include a three-dimensional memory cell array, the three-dimensional memory cell array may include a plurality of NAND strings (or cell strings or memory stacks), and each of the plurality of NAND strings may include memory cells respectively connected to word lines vertically stacked on a substrate, as described with reference to FIGS. 3, 6, and 13. U.S. Pat. Nos. 7,679,133; 8,553,466; 8,654,587; 8,559,235; and U.S. Patent Application Publication No. 2011/0233648, the disclosures of each of which are incorporated by reference herein in their entireties, disclose a three-dimensional memory cell array of a plurality of levels and suitable configurations of the three-dimensional memory array in which word lines and/or bit lines are shared between levels. However, embodiments are not limited thereto, and in some embodiments, the memory cell array MCA may include a two-dimensional memory cell array, and the two-dimensional memory cell array may include a plurality of NAND strings arranged in row and column directions.

The row decoder array X-DEC may include a plurality of row decoders (for example, DEC of FIG. 4), and the plurality of row decoders DEC may select at least one of the plurality of memory blocks BLK1, BLK2, . . . , BLKn in response to a row address signal provided by the control logic circuit and may select the word line WL, the string select line SSL, and the ground select line GSL of the selected memory block. The plurality of row decoders DEC may each provide a voltage to perform a memory operation to the word line WL of the selected memory block.

The page buffer array P/B may include a plurality of page buffers (for example, PB1 to PB8 of FIG. 5B, hereinafter referred to as "PB"), and the plurality of page buffers PB may be respectively connected to memory cells through bit lines BL. The plurality of page buffers PB may each select at least one bit line from among the bit lines BL in response to a column address signal provided from the control logic circuit. For example, during a program operation, the plurality of page buffers PB may each apply a program bit line voltage corresponding to the data DATA to be programmed to the selected bit line. During a read operation, the plurality of page buffers PB may each sense the data DATA stored in a memory cell by sensing a current or a voltage through the selected bit line. The plurality of page buffers PB may be configured to temporarily store the data DATA to be programmed or the data DATA read from memory cells.

Figure 2:
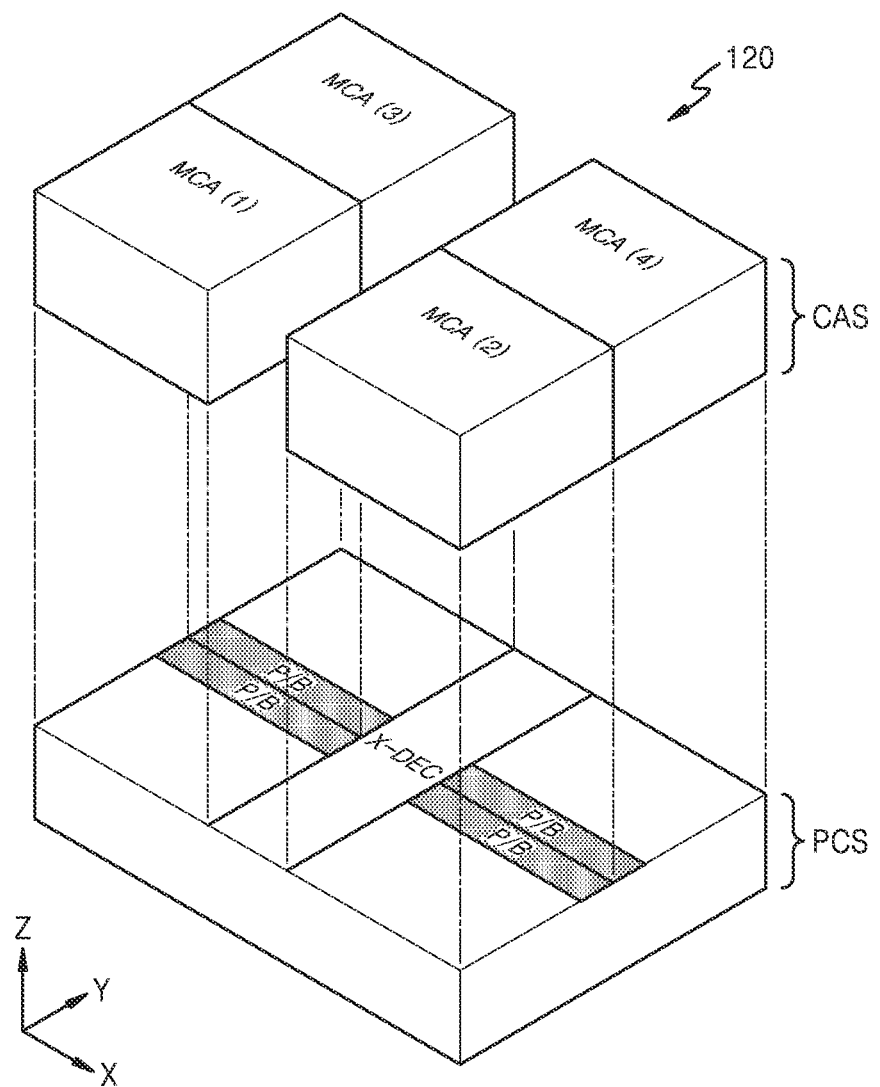
FIG. 2 is a diagram schematically illustrating a structure of the memory device of FIG. 1, according to embodiments.
Figure 3:
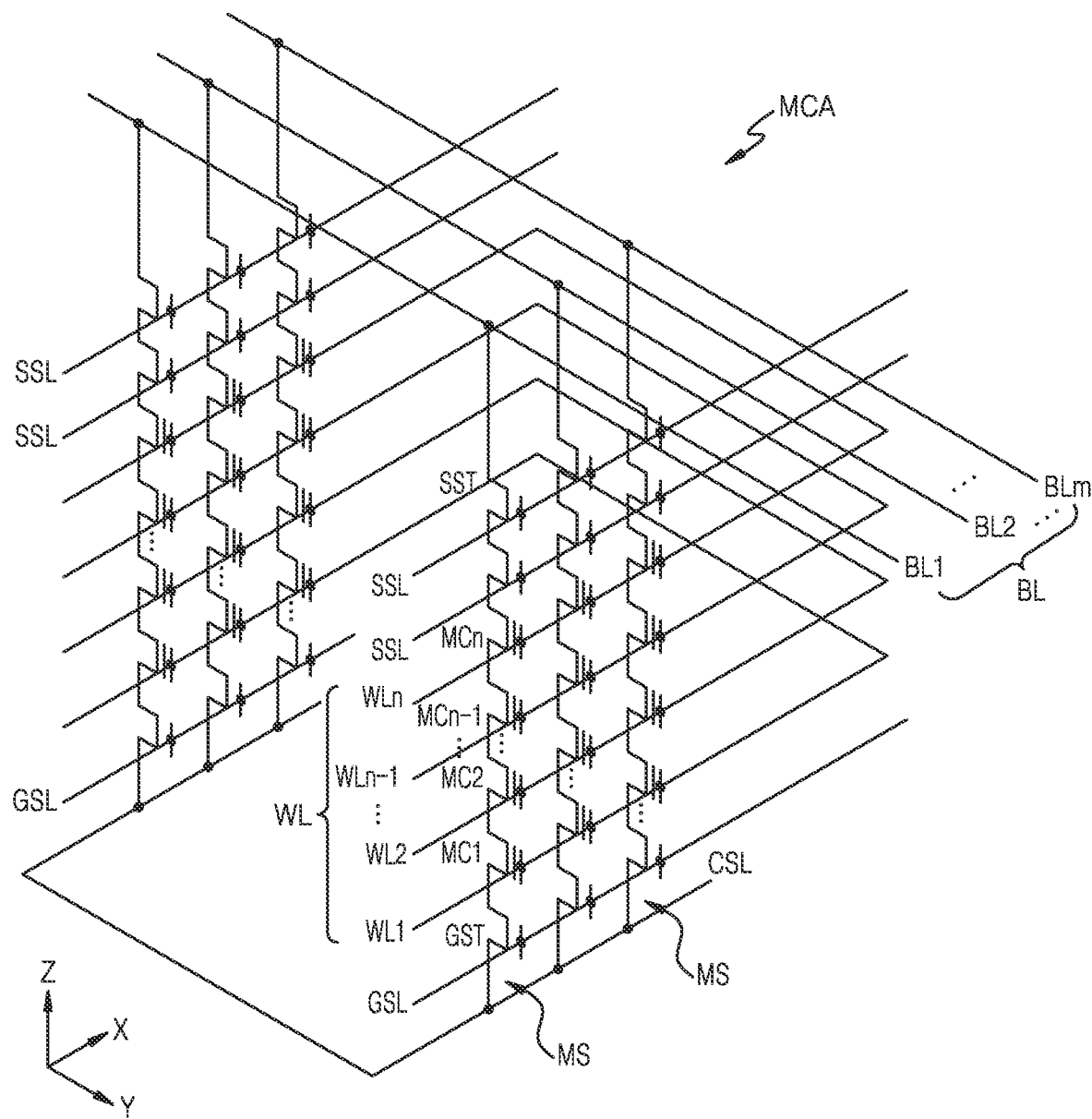
FIG. 3 is an equivalent circuit diagram of a vertical NAND flash memory device having a vertical channel structure of a memory cell array of FIG. 1, according to embodiments.
Figure 4:
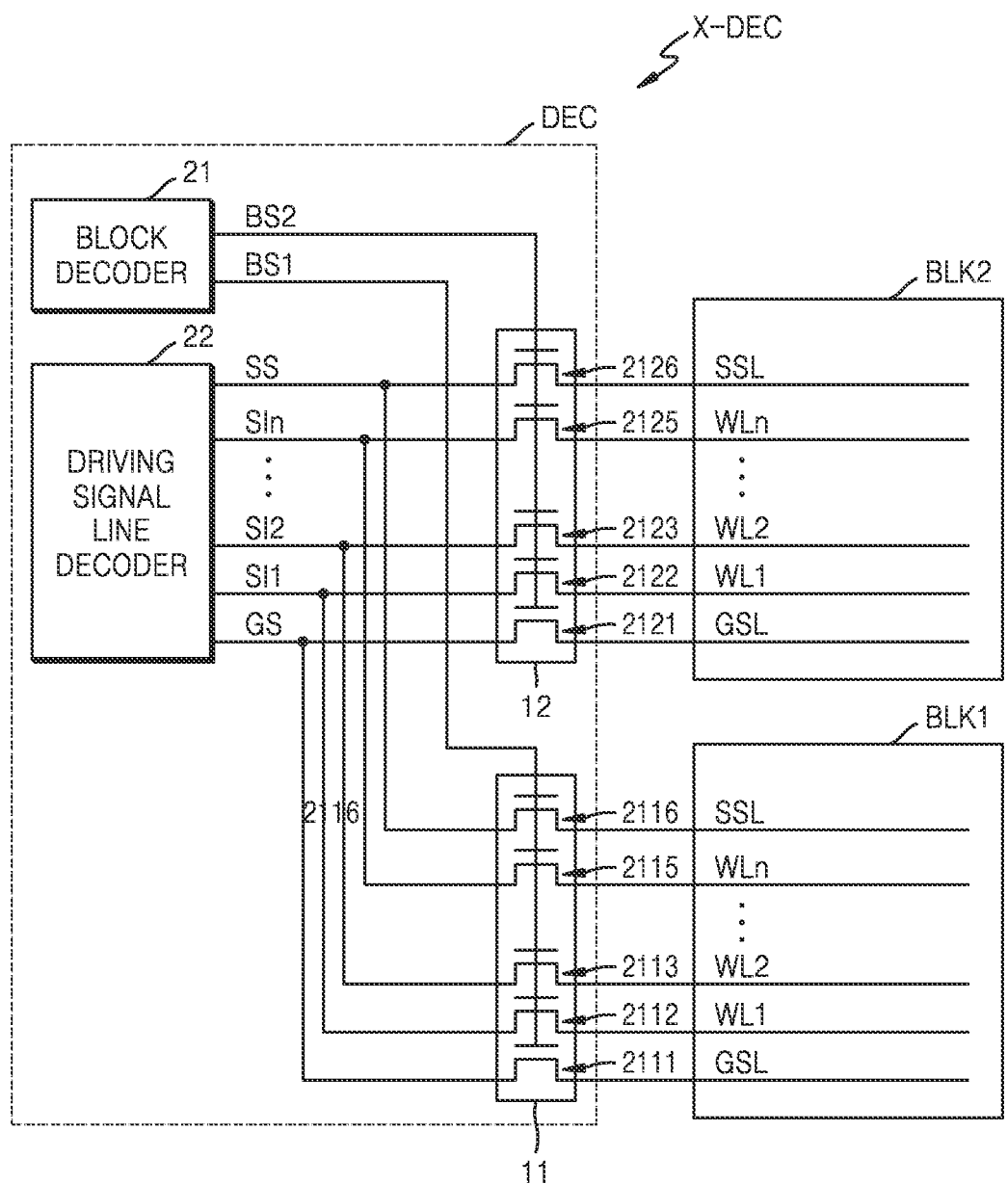
FIG. 4 is a diagram illustrating a row decoder included in a row decoder array of FIG. 1, according to embodiments.
Figure 5A:
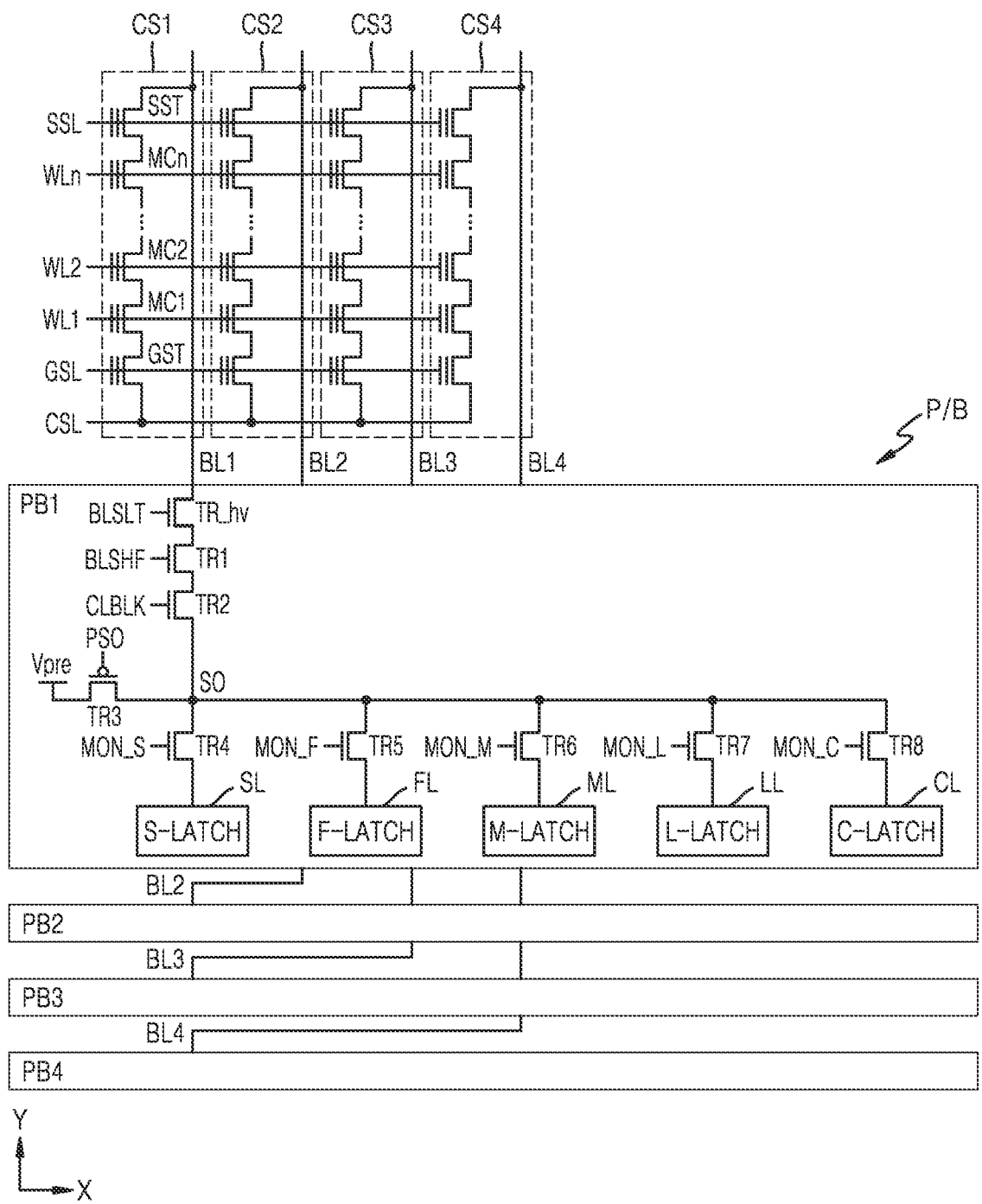
FIGS. 5A and 5B are diagrams illustrating a page buffer included in a page buffer array of FIG. 1, according to embodiments.
Figure 5B:
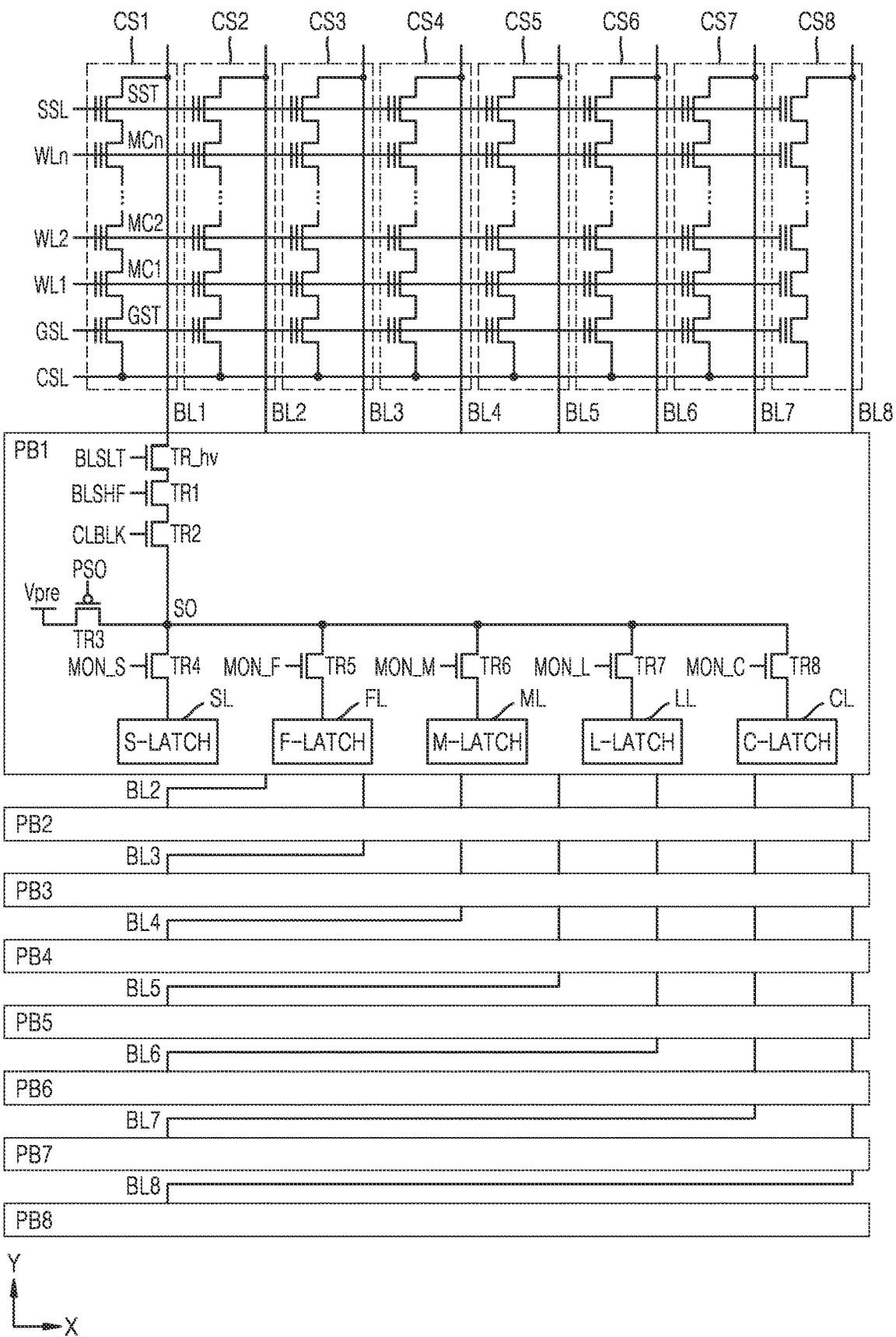
Figure 6:
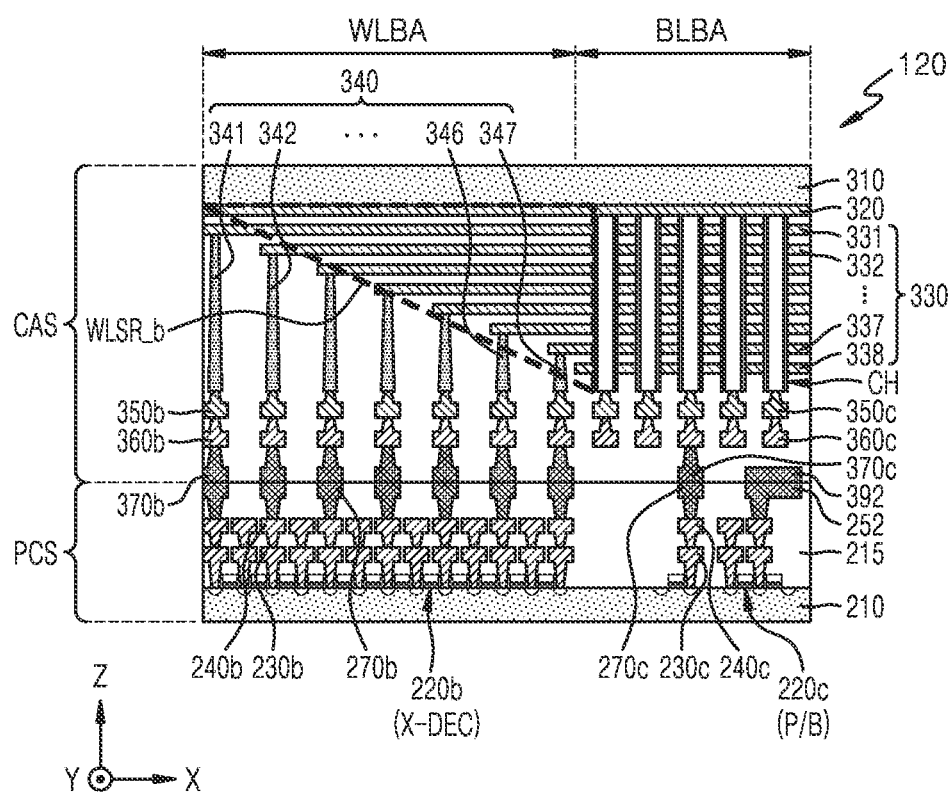
FIG. 6 is a partial cross-sectional view of a memory device according to embodiments.
Figure 7:
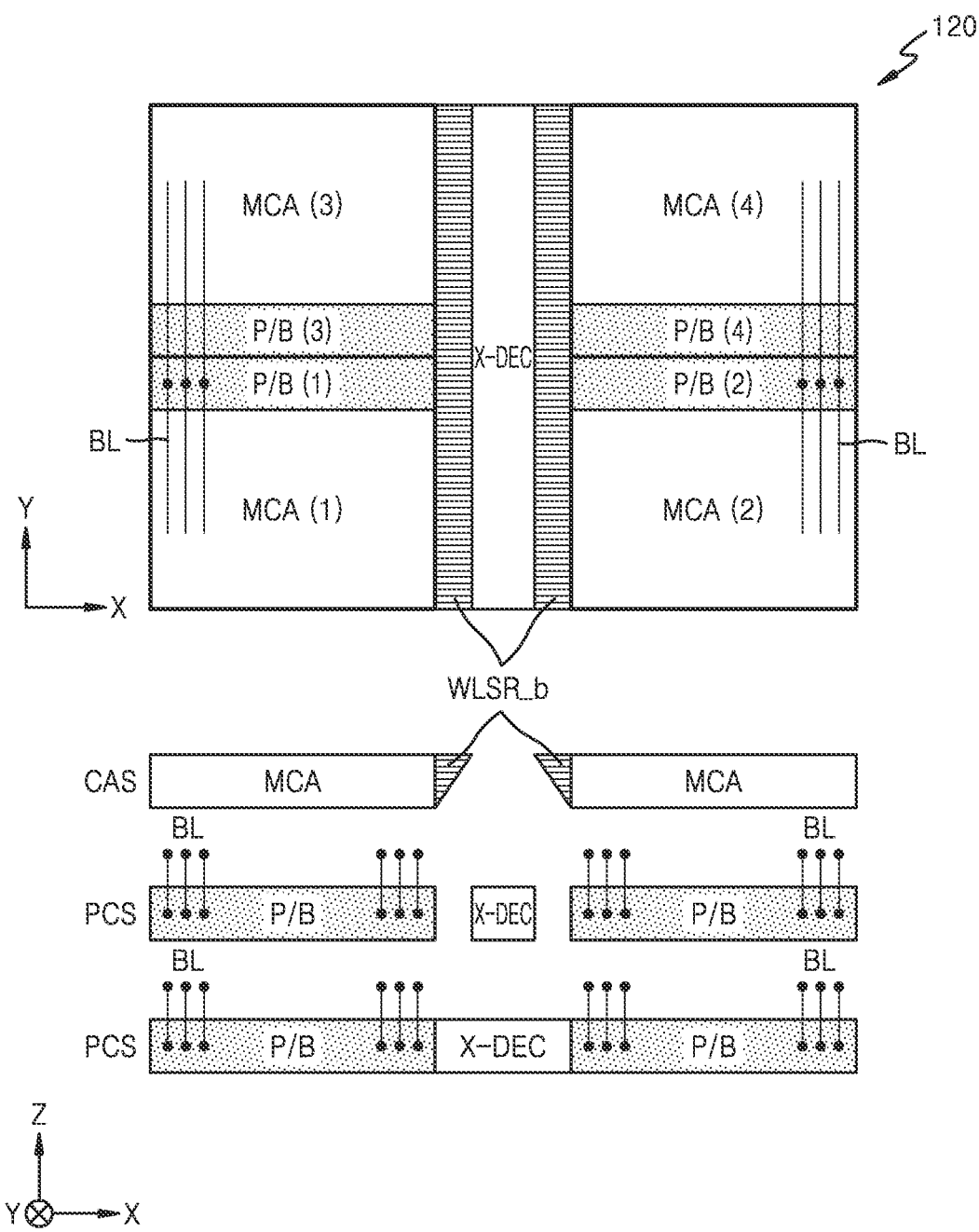
FIG. 7 is a plan view of the memory device of FIG. 1, according to embodiments.

FIGS. 2 to 6 illustrate a memory device according to embodiments. FIG. 2 illustrates a schematic structure of the memory device 120 of FIG. 1, according to embodiments. FIG. 3 illustrates an equivalent circuit diagram of a vertical NAND flash memory device having a vertical channel structure of the memory cell array MCA of FIG. 1, according to embodiments. FIG. 4 is a diagram illustrating the row decoders DEC included in the row decoder array X-DEC of FIG. 1, according to embodiments. FIGS. 5A and 5B are diagrams illustrating the page buffer PB included in the page buffer array P/B of FIG. 1, according to embodiments. FIG. 6 illustrates a partial cross-sectional view of the memory device 120 of FIG. 1, according to embodiments. FIG. 7 illustrates a plan view of the memory device 120 of FIG. 1, according to embodiments.

Referring to FIG. 2, the memory device 120 may include a cell array structure CAS and a peripheral circuit structure PCS that overlap each other in a vertical direction (Z direction). The cell array structure CAS may include memory cell arrays MCA(1), MCA(2), MCA(3), and MCA (4) of each of the first to fourth memory planes 121 to 124 described with reference to FIG. 1. The peripheral circuit structure PCS may include the row decoder array X-DEC and the page buffer array P/B of each of the first to fourth memory planes 121 to 124 described with reference to FIG. 1. The cell array structure CAS may include the plurality of memory cell blocks BLK1, BLK2, . . . , BLKn. The plurality of memory cell blocks BLK1, BLK2, . . . , BLKn may each include three-dimensionally arranged memory cells. In the following embodiments, for the sake of convenience of description, the memory cell array MCA of the first memory plane 121 and the term "MCA(1)" may be used interchangeably. In addition, the memory cell array MCA of the second memory plane 122 and the term "MCA(2)" may be used interchangeably, the memory cell array MCA of the third memory plane 123 and the term "MCA(3)" may be used interchangeably, and the memory cell array MCA of the fourth memory plane 124 and the term "MCA(4)" may be used interchangeably. The row decoder array X-DEC and the term "X-DEC" may be used interchangeably, and the page buffer array P/B and the term "P/B" may be used interchangeably.

Referring to FIG. 3, the memory cell array MCA may include a plurality of memory stacks MS. The memory cell array MCA may include a plurality of bit lines BL (BL1, BL2, . . . , BLm; m is a positive integer), a plurality of word lines WL (WL1, WL2, . . . , WLn−1, WLn; n is a positive integer), one or more string select lines SSL, one or more ground select lines GSL, and a common source line CSL. The plurality of memory stacks MS may be between the plurality of bit lines BL (BL1, BL2, . . . , BLm) and the common source line CSL. In the following embodiments, for the sake of convenience of description, the plurality of memory stacks MS may be referred to as cell strings CS1 to CS4 (see FIG. 5A) or NAND strings.

Each of the plurality of memory stacks MS may include a string select transistor SST, a ground select transistor GST, and a plurality of memory cell transistors MC1, MC2, . . . , MCn−1, MCn. A drain region of the string select transistor SST may be connected to a bit line BL (BL1, BL2, . . . , or BLm), and a source region of the ground select transistor GST may be connected to the common source line CSL. The common source line CSL may be connected in common to source regions of the plurality of ground select transistors GST. The string select transistor SST may be connected to the string select line SSL, and the ground select transistor GST may be connected to the ground select line GSL. The plurality of memory cell transistors MC1, MC2, . . . , MCn-1, MCn may be respectively connected to the plurality of word lines WL (WL1, WL2, . . . , WLn-1, WLn).

FIG. 4 illustrates that the row decoder DEC included in the row decoder array X-DEC is shared by a first memory block BLK1 and a second memory block BLK2 of the plurality of memory blocks BLK1 to BLKn. The row decoder DEC of FIG. 4 is described as a unit row decoder circuit sharing two memory blocks. The row decoder DEC may include pass transistor circuits 11 and 12 respectively corresponding to the first and second memory blocks BLK1 and BLK2. The pass transistor circuit 11 may include a plurality of pass transistors 2111 to 2116, and the pass transistor circuit 12 may include a plurality of pass transistors 2121 to 2126. The first and second memory blocks BLK1 and BLK2 may be adjacent to each other, and each of the first and second memory blocks BLK1 and BLK2 may include the ground select line GSL and the plurality of word lines WL1 to WLn, and the string select line SSL.

The row decoder DEC may further include a block decoder 21 and a driving signal line decoder 22. The block decoder 21 may be connected to the pass transistor circuit 11 through a first block select signal line and may be connected to the pass transistor circuit 12 through the second block select signal line. The first block select signal line may be connected to gates of the plurality of pass transistors 2111 to 2116. For example, when a first block select signal BS1 is activated, the plurality of pass transistors 2111 to 2116 are turned on, and accordingly, the first memory block BLK1 may be selected. The second block select signal line may be connected to gates of the plurality of pass transistors 2121 to 2126. For example, when a second block select signal BS2 is activated, the plurality of pass transistors 2121 to 2126 are turned on, and accordingly, the second memory block BLK1 may be selected.

The driving signal line decoder 22 may be connected to the pass transistor circuits 11 and 12 through a string select line driving signal line, word line driving signal lines, and a ground select line driving signal line. Specifically, the string select line driving signal line, the word line driving signal lines, and the ground select line driving signal line may be respectively connected to sources of the plurality of pass transistors 2111 to 2116 and 2121 to 2126.

The pass transistor circuit 11 may be connected to the first memory block BLK1 through the ground select line GSL, the plurality of word lines WL1 to WLn, and the string select line SSL. The pass transistor 2111 may be connected between the ground select line driving signal line and the ground select line GSL. The pass transistors 2112 to 2115 may be respectively connected between word line driving signal lines SI1 to SIn and the plurality of word lines WL1 to WLn. The pass transistor 2116 may be connected between the string select line driving signal line and the string select line SSL. For example, when the first block select signal BS1 is activated, the pass transistors 2111 to 2116 may respectively provide drive signals SS provided through the ground select line driving signal line, the word line driving signal lines, and the string select line driving signal line to the ground select line GSL, the plurality of word lines WL1 to WLn, and the string select line SSL. The descriptions of the pass transistor circuit 11 may also be applied to the pass transistor circuit 12, and accordingly, redundant descriptions thereof are omitted.

Referring to FIG. 5A, a plurality of page buffers PB1 to PB4 of the page buffer array P/B may be arranged in a line in the Y-axis direction in which the bit lines BL1 to BL4 extend. For example, the second page buffer PB2 may be under the first page buffer PB1. The first page buffer PB1 may be connected to the first cell string CS1 through the first bit line BL1. The second page buffer PB2 may be connected to the second cell string CS2 through the second bit line BL2, the third page buffer PB3 may be connected to the third cell string CS3 through the third bit line BL3, and the fourth page buffer PB4 may be connected to the fourth cell string CS4 through the fourth bit line BL4. In the embodiment illustrated in FIG. 5A, a configuration of the page buffer array P/B in which four page buffers PB1 to PB4 are arranged in a line is shown. However, embodiments are not limited to the configuration illustrated in FIG. 5A. According to embodiments, a smaller or larger number of page buffers than in the illustration of FIG. 5A may be arranged in a line in the second direction Y in which the bit lines BL1 to BL4 extend. As illustrated in FIG. 5B, eight page buffers PB1 to PB8 in the page buffer array P/B may be arranged in a line.

For example, a configuration of the page buffer array P/B in which the four page buffers PB1 to PB4 of FIG. 5A are arranged in a line is P/B_1 may be applied to a page buffer array P/B_1 to be described with reference to FIGS. 8 to 12 and FIGS. 14 to 18, and a configuration of the page buffer array P/B in which the eight page buffers PB1 to PB8 of FIG. 5B are arranged in a line may be applied to a page buffer array P/B_2. In contrast to this configuration, the configuration of the page buffer array P/B in which the four page buffers PB1 to PB4 of FIG. 5A are arranged in a line is P/B_1 may be applied to the page buffer array P/B_2, and the configuration of the page buffer array P/B in which the eight page buffers PB1 to PB8 of FIG. 5B are arranged in a line may be applied to the page buffer array P/B_1.

In FIGS. 5A and 5B, the first to eighth page buffers PB1 to PB8 may be configured in the same manner as each other. Accordingly, the configuration of the first page buffer PB1 will be mainly described for conciseness, and it will be understood that the description applies similarly to the other page buffers. For example, the first page buffer PB1 may include a first transistor TR1 driven by a bit line shut-off signal BLSHF and a second transistor TR2 driven by a bit line connection control signal CLBLK. A high voltage transistor TR_hv that is driven by a bit line select signal BLSLT may be between the first bit line BL1 and the first transistor TR1. The first page buffer PB1 may further include a third transistor TR3 driven by a precharge control signal PSO. When the third transistor TR3 is turned on by the precharge control signal PSO of a logic low level, a precharge operation of the first page buffer PB1 may start to increase a voltage of a sensing node SO, and accordingly, the sensing node SO may be precharged to a voltage level corresponding to a precharge voltage Vpre. When the third transistor TR3 is turned off by the precharge voltage Vpre of a logic high level, the precharge operation of the first page buffer PB1 may end.

When the first and second transistors TR1 and TR2 are turned on after the precharge operation is performed and the third transistor TR3 is turned off, a develop operation of the first page buffer PB1 may start. During a development period, the voltage of the sensing node SO may change according to data stored in a first memory cell MC1 selected from among a plurality of memory cell transistors MC1, MC2, . . . , MCn. For example, when the first memory cell MC1 is an on-cell, the voltage of the sensing node SO may be reduced to a voltage lower than a reference voltage. When the first memory cell MC1 is an off-cell, the voltage of the sensing node SO may be maintained as a voltage higher than the reference voltage. The reference voltage may determine whether the first memory cell MC1 is an on-cell or an off-cell. That is, the reference voltage may be used to determine whether the data value stored in the first memory cell MC1 is 0 or 1. When the second transistor TR2 is turned off, the develop operation of the first page buffer PB1 may end.

The first page buffer PB1 may include a sense latch SL, a force latch FL, an upper bit latch ML, a lower bit latch LL, and a cache latch CL that are connected to the sensing node SO respectively through fourth to eighth transistors TR4 to TR8. According to an embodiment, the sense latch SL, the force latch FL, the upper bit latch ML, or the lower bit latch LL may be referred to as a "main latch". Although not illustrated, in some embodiments, the first page buffer PB1 may further include a precharge circuit that may control a precharge operation of the first bit line BL1 or the sensing node SO based on a bit line clamping control signal and may further include a transistor that is driven by a bit line setup signal.

After the develop operation, when the fourth transistor TR4 is turned on by a sensing monitoring signal MON_S of a logic high level, data sensed from the first memory cell MC1 is stored in the sense latch SL. A sensing operation of the first page buffer PB1 may be performed by storing the data stored in the first memory cell MC1 in the sense latch SL. During a read operation or a program verify operation, the sense latch SL may store data stored in the first memory cell MC1 or a result of sensing a threshold voltage of the first memory cell MC1. During a program operation, the sense latch SL may be used to apply a program bit line voltage or a program inhibit voltage to the first bit line BL1.

When the fifth transistor TR5 is turned on by a forcing monitoring signal MON_F of a logic high level, the force latch FL may be used to improve threshold voltage distribution during the program operation. Specifically, the force latch FL stores force data. The force data may be initially set to '1' and then reversed to '0' when a threshold voltage of a memory cell reaches a forcing level that is less than a target level. During a program execution operation, the force data may be used to control a bit line voltage and to form a narrower program threshold voltage distribution.

When the sixth and seventh transistors TR6 and TR7 are turned on by an upper bit monitoring signal MON_M of a logic high level and a lower bit monitoring signal MON_L of a logic high level, an upper bit latch ML and a lower bit latch LL that store target data may be set according to the sensed data stored in the sense latch SL. When the sensed data indicates that programming is completed, the upper bit latch ML and the lower bit latch LL may be switched to program inhibit setting for the selected memory cell in a subsequent program loop.

When the eighth transistor TR8 is turned on by a cache monitoring signal MON_C of a logic high level, the cache latch CL may receive the data read from a memory cell from the sensing latch SL during a read operation and output the data to the outside through an input/output line. The cache latch CL may temporarily store input data received from the outside. During the program operation, target data stored in the cache latch CL may be stored in the upper bit latch ML and the lower bit latch LL. The cache latch CL may be adjacent to a data input/output line, and accordingly, the first page buffer PB1 may have a structure in which a page buffer is separated from the cache latch CL.

According to some embodiments, the upper bit latch ML, the lower bit latch LL, and the cache latch CL may be used to store data input from the outside during a program operation and may be referred to as a "data latch". When data of three bits are programmed in one memory cell, the data of three bits may be respectively stored in the upper bit latch ML, the lower bit latch LL, and the cache latch CL. The upper bit latch ML, the lower bit latch LL, and the cache latch CL may retain the stored data until programming of a memory cell is completed.

As described above, each of the page buffers included in the page buffer array P/B may sense data stored in a memory cell through a precharge operation, a develop operation, and a sensing operation based on transistors. Transistors of each of the page buffers may be driven based on control signals (for example, BLSHF, CLBLK, PSO, MON_S, MON_F, MON_M, MON_L, and MON_C) provided by a page buffer control circuit.

FIG. 6 illustrates partial cross-sectional views of the cell array structure CAS and the peripheral circuit structure PCS described with reference to FIG. 2, according to an embodiment. The memory device 120 may have a chip to chip (C2C) structure. The C2C structure may be implemented by respectively fabricating at least one upper chip including the cell array structure CAS and a lower chip including the peripheral circuit structure PCS, and then connecting the at least one upper chip to the lower chip by using a bonding method. The bonding method may refer to, for example, a method of electrically or physically connecting a bonding metal pattern formed in the uppermost metal layer of an upper chip to a bonding metal pattern formed in the uppermost metal layer of a lower chip. For example, when the bonding metal patterns are formed of copper (Cu), the bonding method may be a Cu—Cu bonding method. In another example, the bonding metal patterns may also be formed of aluminum (Al) or tungsten (W). That is, in some embodiments, the bonding method may be a Al—Al bonding method or a W—W bonding method, etc.

The peripheral circuit structure PCS may include a first substrate 210 and a plurality of circuit elements 220b and 220c formed on the first substrate 210. An interlayer insulating layer 215 including one or more insulating layers may be provided on the plurality of circuit elements 220b and 220c, and a plurality of metal wires connecting the plurality of circuit elements 220b and 220c to each other may be provided in the interlayer insulating layer 215. For example, the plurality of metal wires may include first metal wires 230b and 230c respectively connected to the plurality of circuit elements 220b and 220c and second metal wires 240b and 240c formed on the first metal wires 230b and 230c.

The cell array structure CAS may include a second substrate 310 and a common source line 320. A plurality of word lines 331 to 338 (330) may be stacked on the second substrate 310 in the Z-axis direction perpendicular to an upper surface of the second substrate 310. String select lines and a ground select line may be arranged over and under the plurality of word lines 330, and the plurality of word lines 330 may be between the string select lines and the ground select line. A plurality of channel structures CH may be formed in the cell array structure CAS. The plurality of channel structures CH may be provided in a bit line bonding region BLBA and may extend in a direction perpendicular to an upper surface of the second substrate 310 to pass through the plurality of word lines 330, the string select lines, and the ground select line. The plurality of channel structures CH may each include a data storage layer, a channel layer, and a buried insulating layer. The channel layer may be electrically connected to a first metal wire 350c and a second metal wire 360c in the bit line bonding region BLBA. For example, the second metal wire 360c may be a bit line (and referred to as a bit line) and may be connected to the channel structure CH through the first metal wire 350c. The bit line 360c may extend in a first direction (a Y-axis direction) parallel to the upper surface of the second substrate 310.

In the bit line bonding region BLBA, an upper metal pattern 252 may be formed on the uppermost metal layer of the peripheral circuit structure PCS, and an upper metal pattern 392 having the same shape as the upper metal pattern 252 may be formed on the uppermost metal layer of the cell array structure CAS. The upper metal pattern 392 of the cell array structure CAS may be electrically connected to the upper metal pattern 252 of the peripheral circuit structure PCS by a bonding method. In the bit line bonding region BLBA, the bit line 360c may be electrically connected to the page buffer PB (FIG. 5) included in the peripheral circuit structure PCS. For example, some of the circuit elements 220c of the peripheral circuit structure PCS may provide the page buffer array P/B, and the bit line 360c may be electrically connected to the circuit elements 220c providing the page buffer array P/B through the upper bonding metal 370c of the cell array structure CAS and the upper bonding metal 270c of the peripheral circuit structure PCS.

A first metal wire 350b and a second metal wire 360b may be sequentially connected to an upper portion of each of a plurality of cell contact plugs 340 respectively connected to the plurality of word lines 330. The plurality of cell contact plugs 340 may be connected to the peripheral circuit structure PCS through an upper bonding metal 370b of the cell array structure CAS and an upper bonding metal 270b of the peripheral circuit structure PCS in a word line bonding region WLBA. The plurality of cell contact plugs 340 may be electrically connected to the row decoder DEC (FIG. 4) included in the peripheral circuit structure PCS. For example, some of the circuit elements 220b of the peripheral circuit structure PCS provide the row decoder array X-DEC, and the plurality of cell contact plugs 340 may be electrically connected to the circuit elements 220b that provide the row decoder array X-DEC through the upper bonding metals 370b of the cell array structure CAS and the upper bonding metals 270b of the peripheral circuit structure PCS.

In the word line bonding region WLBA, the plurality of word lines 330 of the cell array structure CAS may extend in the X-axis direction parallel to an upper surface of the second substrate 310 and may be connected to the plurality of cell contact plugs 340. The plurality of word lines 330 may include a plurality of word line step regions WLSR_b having a cross-section of a step shape and connected to the plurality of cell contact plugs 340, as illustrated in FIG. 6.

Referring to FIG. 7, in the memory device 120, the memory cell arrays MCA(1), MCA(2), MCA(3), and MCA(4) of each of the first, second, third, and fourth memory planes 121, 122, 123, and 124 are in the cell array structure CAS, and the word line step region WLSR_b of each of the memory cell arrays MCA(1), MCA(2), MCA(3), and MCA(4) are also in the cell array structure CAS. The page buffer arrays P/B(1) and P/B(3) respectively connected to the memory cell arrays MCA(1) and MCA(3) and the page buffer arrays P/B(2) and P/B(4) respectively connected to the memory cell arrays MCA(2) and MCA(4) may be in the peripheral circuit structure PCS, and the row decoder array X-DEC connected to the memory cell arrays MCA(1), MCA(2), MCA(3), and MCA(4) may be in the peripheral circuit structure PCS.

The page buffer arrays P/B(1) and P/B(3) may be adjacent to each other, and the bit lines BL of the memory cell array MCA(1) and the bit lines BL of the memory cell array MCA(3) may be respectively connected to the page buffer arrays P/B(1) and P/B(3). The page buffer arrays P/B(2) and P/B(4) may be adjacent to each other, and the bit lines BL of the memory cell array MCA(2) and the bit lines BL of the memory cell array MCA(4) may be respectively connected to the page buffer arrays P/B(2) and P/B(4). The page buffer arrays P/B(1) and P/B(3) and the page buffer arrays P/B(2) and P/B(4) may be in a central part of a length in the Y-axis direction of a memory die or a memory chip in which the memory device 120 is formed. The page buffer arrays P/B(1) and P/B(3) may be symmetric to the page buffer arrays P/B(2) and P/B(4).

The row decoder array X-DEC may be in a lower region between the word line step regions WLSR_b of the memory cell arrays MCA(1) and MCA(3) and the word line step regions WLSR_b of the memory cell arrays MCA(2) and MCA(4). The row decoder array X-DEC may be in a central part of a length in the X-axis direction of the memory die or the memory chip in which the memory device 120 is formed.

The number of word lines WL vertically stacked in the memory cell arrays MCA(1), MCA(2), MCA(3), and MCA(4) may increase according to the trend of increasing the capacity of memory blocks. Due to the increased number of word lines WL, the word line step regions WLSR_b extended to the plurality of word lines WL and the row decoder array X-DEC also increase in size, and accordingly, the size of a memory chip may increase. However, the length of the memory chip in the X direction may be limited to match the length of a package in the X direction in which the memory chip is mounted. The number of stacked word lines may be limited due to limitation of the length of the memory chip in the X-direction, which causes disadvantages in that the capacity of a memory block is limited. Accordingly, when the row decoder array X-DEC in the central part of the length of the memory chip in the X direction is buried under the word line step regions WLSR_b, the size of a memory chip may be reduced.

Figure 8:
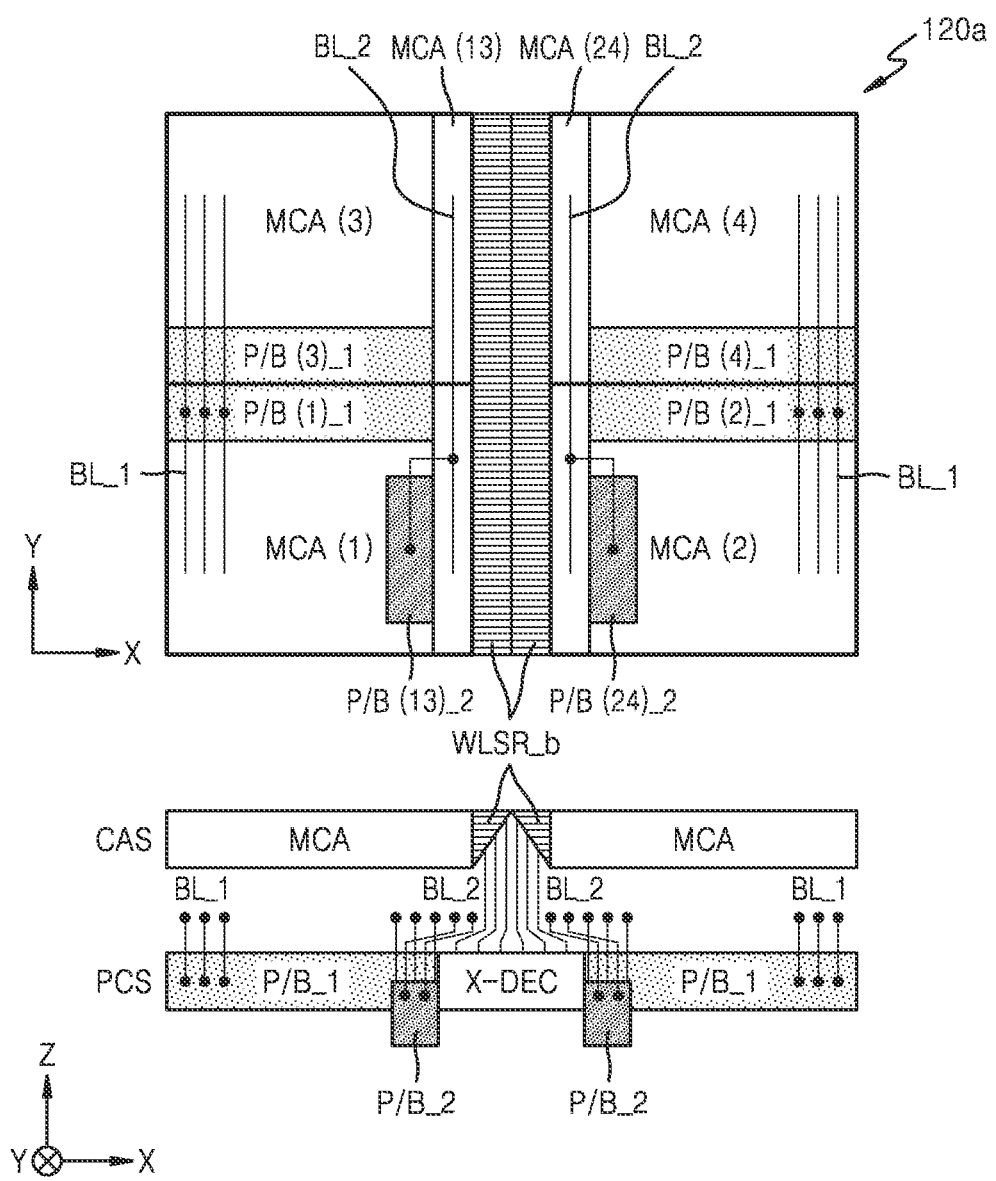
FIGS. 8 to 12 are views illustrating memory devices according to various embodiments.

FIGS. 8 to 11 illustrate a memory device according to various embodiments. Hereinafter, suffixes (for example, a of 120a and b of 120b) attached to the same reference numerals in different drawings are used to distinguish between a plurality of circuits having similar or identical functions. Layouts of the row decoder array X-DEC and the page buffer array P/B for each memory plane of a memory device 120a of FIG. 8 are different from layouts of the row decoder array X-DEC and the page buffer array P/B for each memory plane of the memory device 120 of FIG. 7. Previously given descriptions of the memory device 120 are omitted for conciseness.

Referring to FIG. 8, word line step regions WLSR_b of the memory cell arrays MCA(1) and MCA(3) in the memory device 120a and word line step regions WLSR_b of the memory cell arrays MCA(2) and MCA(4) in the memory device 120a may be adjacent to each other in the central part of the length of the cell array structure CAS in the X-axis direction. In other words, in some embodiments, the word line step regions WLSR_b of the memory cell arrays MCA(1) and MCA(3) in the memory device 120a and word line step regions WLSR_b of the memory cell arrays MCA(2) and MCA(4) in the memory device 120a may not be spaced apart from each other as in FIG. 7. The row decoder array X-DEC may be in the peripheral circuit structure PCS vertically overlapping the word line step regions WLSR_b of the cell array structure CAS, a partial region MCA(13) of the memory cell arrays MCA(1) and MCA(3) adjacent to the word line step regions WLSR_b, and a partial region MCA(24) of the memory cell arrays MCA(2) and MCA(4) adjacent to the word line step regions WLSR_b.

The partial regions MCA(13) of the memory cell arrays MCA(1) and MCA(3), which in FIG. 7 are regions where the page buffer arrays P/B(1) and P/B(3) are arranged, may be designed such that, as illustrated in FIG. 8, the row decoder array X-DEC may be arranged. In other words, the row decoder array X-DEC may be arranged in a portion of regions in which the page buffer arrays P/B(1) and P/B(3) would normally be arranged. Accordingly, as illustrated in FIG. 8, a page buffer array P/B(1) connected to the memory cell array MCA(1) of FIG. 7 may be divided into two page buffer arrays P/B(1)_1 and P/B(13)_2. The page buffer array P/B(13)_2 may be connected to bit lines BL_2 included in the memory cell region MCA(13) in the peripheral circuit structure PCS in which the row decoder array X-DEC is arranged, under the memory cell array MCA(1), and the page buffer array PB(1)_1 may be connected to the other bit lines BL_1 not included in the memory cell array MCA(13) of the memory cell array MCA(1).

The page buffer array P/B(3) connected to the memory cell array MCA(3) of FIG. 7 may also be divided into two page buffer arrays P/B(3)_1 and P/B(13)_2. The page buffer array P/B(13)_2 may be connected to bit lines BL_2 included in the memory cell region MCA(13) in the peripheral circuit structure PCS in which the row decoder array X-DEC is arranged, under the memory cell array MCA(3), and the page buffer array PB(3)_1 may be connected to the other bit lines BL_1 not included in the memory cell array MCA(13) of the memory cell array MCA(3).

The bit lines BL_2 in the partial regions MCA(13) of the memory cell arrays MCA(1) and MCA(3) may be connected to the page buffer array P/B(13)_2. As illustrated in FIG. 8, the page buffer arrays PB(1)_1 and PB(3)_1 may respectively overlap parts of the memory cell arrays MCA(1) and MCA(3) at the center of a memory die or a memory chip in the Y-axis direction in which the memory device 120a is formed. The page buffer array P/B(13)_2 may overlap parts of the page buffer arrays PB(1)_1 and PB(3)_1 in the X-axis direction. In the embodiment illustrated in FIG. 8, the page buffer array P/B(13)_2 may be in the peripheral circuit structure PCS corresponding to a lower portion of the memory cell array MCA(1). In some embodiments, the page buffer array P/B(13)_2 may be in the peripheral circuit structure PCS corresponding to a lower portion of the memory cell array MCA(3). Accordingly, the page buffers P/B(1)_1 and PB(13)_2 of the memory cell array MCA(1) may be asymmetric to the page buffers P/B(3)_1 and PB(13)_ 2.

Partial regions MCA(24) of the memory cell arrays MCA (2) and MCA(4), which, in FIG. 7, are regions where the page buffer arrays P/B(2) and P/B(4) are arranged, may be designed such that, as illustrated in FIG. 8, the row decoder array X-DEC may be arranged. In other words, the row decoder array X-DEC may be arranged in a portion of regions in which the page buffer arrays P/B(2) and P/B(4) would normally be arranged. Accordingly, the page buffer array P/B(2) connected to the memory cell array MCA(2) of FIG. 7 may be divided into two page buffer arrays P/B(2)_1 and P/B(24)_2. The page buffer array P/B(24)_2 may be connected to the bit lines BL_2 included in the memory cell region MCA(24) in the peripheral circuit structure PCS in which the row decoder array X-DEC is arranged, under the memory cell array MCA(2), and the page buffer array PB(2)_1 may be connected to the other bit lines BL_1 not included in the memory cell array MCA(24) of the memory cell array MCA(2).

The page buffer array P/B(4) connected to the memory cell array MCA(4) of FIG. 7 may also be divided into two page buffer arrays P/B(4)_1 and P/B(24)_2. The page buffer array P/B(24)_2 may be connected to the bit lines BL_2 included in the memory cell region MCA(24) in the peripheral circuit structure PCS in which the row decoder array X-DEC is arranged, under the memory cell array MCA(4), and the page buffer array PB(4)_1 may be connected to the other bit lines BL_1 not included in the memory cell array MCA(24) of the memory cell array MCA(4).

The lines BL_2 in the partial regions MCA(24) of the memory cell arrays MCA(2) and MCA(4) may be connected to the page buffer array P/B(24)_2. As illustrated in FIG. 8, the page buffer arrays PB(2)_1 and PB(4)_1 may respectively overlap, in the X-axis direction, parts of the memory cell arrays MCA(2) and MCA(4) at the center of the memory die or the memory chip in the Y-axis direction in which the memory device 120a is formed. The page buffer array P/B(24)_2 may overlap parts of the page buffer arrays PB(2)_1 and PB(4)_1 in the X-axis direction. In the embodiment illustrated in FIG. 8, the page buffer array P/B(24)_2 may be in the peripheral circuit structure PCS corresponding to a lower portion of the memory cell array MCA(2). In some embodiments, the page buffer array P/B(24)_2 may be in the peripheral circuit structure PCS corresponding to a lower portion of the memory cell array MCA(4). Accordingly, the page buffers P/B(2)_1 and PB(24)_2 of the memory cell array MCA(2) may be asymmetric to the page buffers P/B(4)_1 and PB(24)_2.

Figure 9:
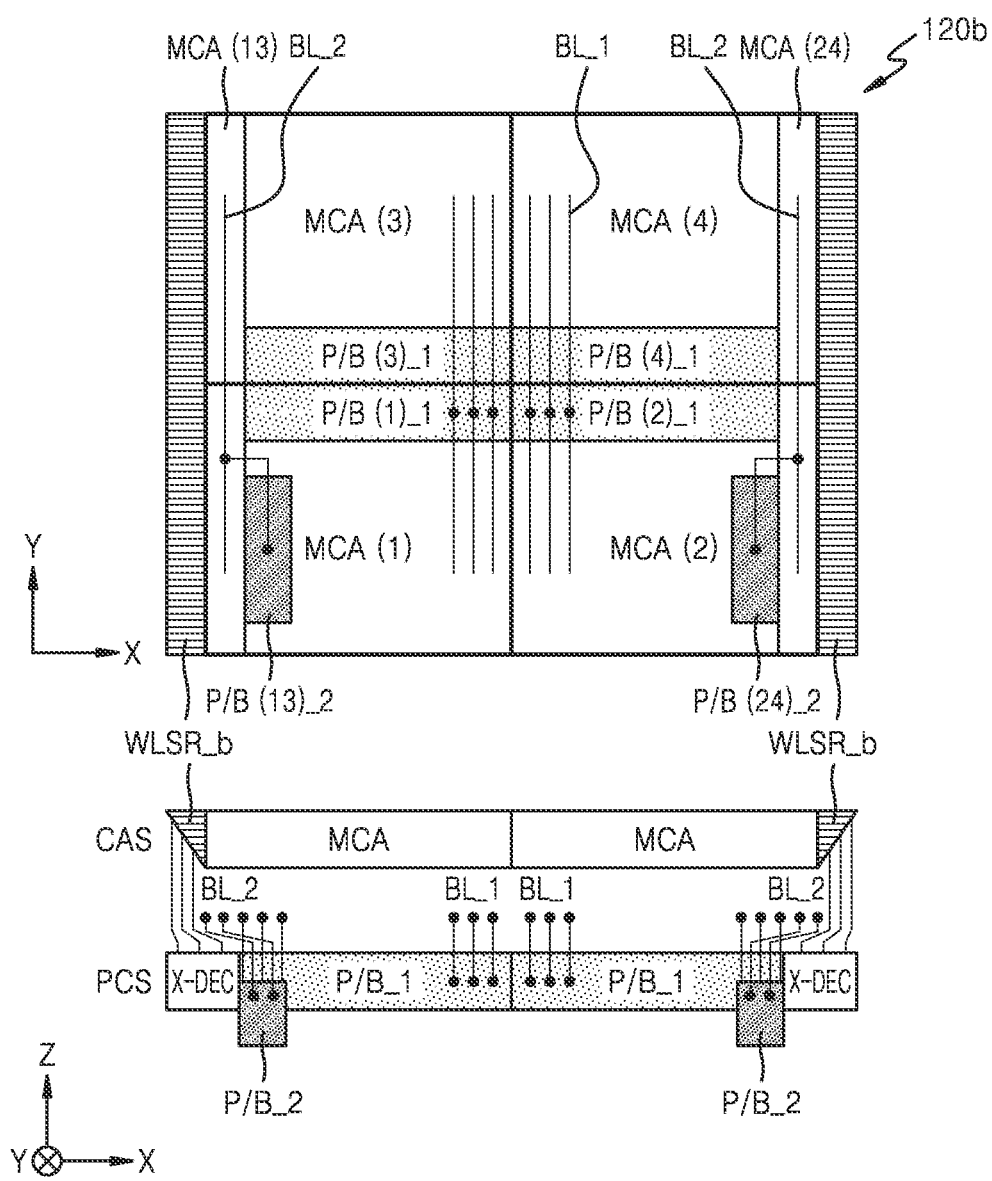

Referring to FIG. 9, a memory device 120b is different from the memory device 120a of FIG. 8 in that the word line step region WLSR_b of memory cell arrays MCA(1) and MCA(3) and word line step region WLSR_b of memory cell arrays MCA(2) and MCA(4) are on both edges of the cell array structure CAS in the X-axis direction. In other words, the word line step region WLSR_b of memory cell arrays MCA(1) and MCA(3) and word line step region WLSR_b of memory cell arrays MCA(2) and MCA(4) are on outer edges of the cell array structure CAS in the X-axis direction. The memory device 120b is different from the memory device 120a in that the word line step region WLSR_b of the cell array structure CAS, partial regions MCA(13) of the memory cell arrays MCA(1) and MCA(3) adjacent to the word line step region WLSR_b, and a row decoder array X-DEC in the peripheral circuit structure PCS corresponding to a lower portion of partial regions MCA(24) of the memory cell arrays MCA (2) and MCA (4) adjacent to the word line step region WLSR_b are also arranged on both edges in the X-axis direction. In other words, the word line step region WLSR_b of the cell array structure CAS, partial regions MCA(13) of the memory cell arrays MCA(1) and MCA(3) adjacent to the word line step region WLSR_b, and a row decoder array X-DEC in the peripheral circuit structure PCS corresponding to a lower portion of partial regions MCA(24) of the memory cell arrays MCA (2) and MCA (4) adjacent to the word line step region WLSR_b are arranged on outer edges of the cell array structure CAS in the X-axis direction.

The row decoder array X-DEC connected to the memory cell arrays MCA(1) and MCA(2) may be on one edge, in the X-axis direction, of the peripheral circuit structure PCS corresponding to a lower portion of the word line step regions WLSR_b and partial regions MCA(13) of the memory cell arrays MCA(1) and MCA(3), and the row decoder array X-DEC connected to the memory cell arrays MCA(3) and MCA(4) may be on another edge, in the X-axis direction, of the peripheral circuit structure PCS corresponding to a lower portion of the word line step regions WLSR_b and partial regions MCA(24) of the memory cell arrays MCA(2) and MCA(4).

As described with reference to FIG. 8, the page buffer arrays PB(1)_1 and PB(3)_1 respectively connected to the memory cell arrays MCA(1) and MCA(3) may be in the central part of a memory die or a memory chip in the Y-axis direction in which the memory device 120b is formed, the page buffer array P/B(13)_2 may overlap parts of the page buffer arrays PB(1)_1 and PB(3)_1 in the X-axis direction, and the page buffers P/B(1)_1 and PB(13)_2) of the memory cell array MCA(1) may be asymmetric to the page buffers P/B(3)_1 and PB(13)_2) of the memory cell array MCA(3). In addition, the page buffer arrays PB(2)_1 and PB(4)_1 respectively connected to the memory cell arrays MCA(2) and MCA(4) may be in the central part of the memory die or the memory chip in the Y-axis direction in which the memory device 120b is formed, the page buffer array P/B(24)_2 may overlap parts of the page buffer arrays PB(2)_1 and PB(4)_1 in the X-axis direction, and the page buffers P/B(2)_1 and PB(24)_2) of the memory cell array MCA(2) may be asymmetric to the page buffers P/B(4)_1 and PB(24)_2) of the memory cell array MCA(4).

Figure 10:
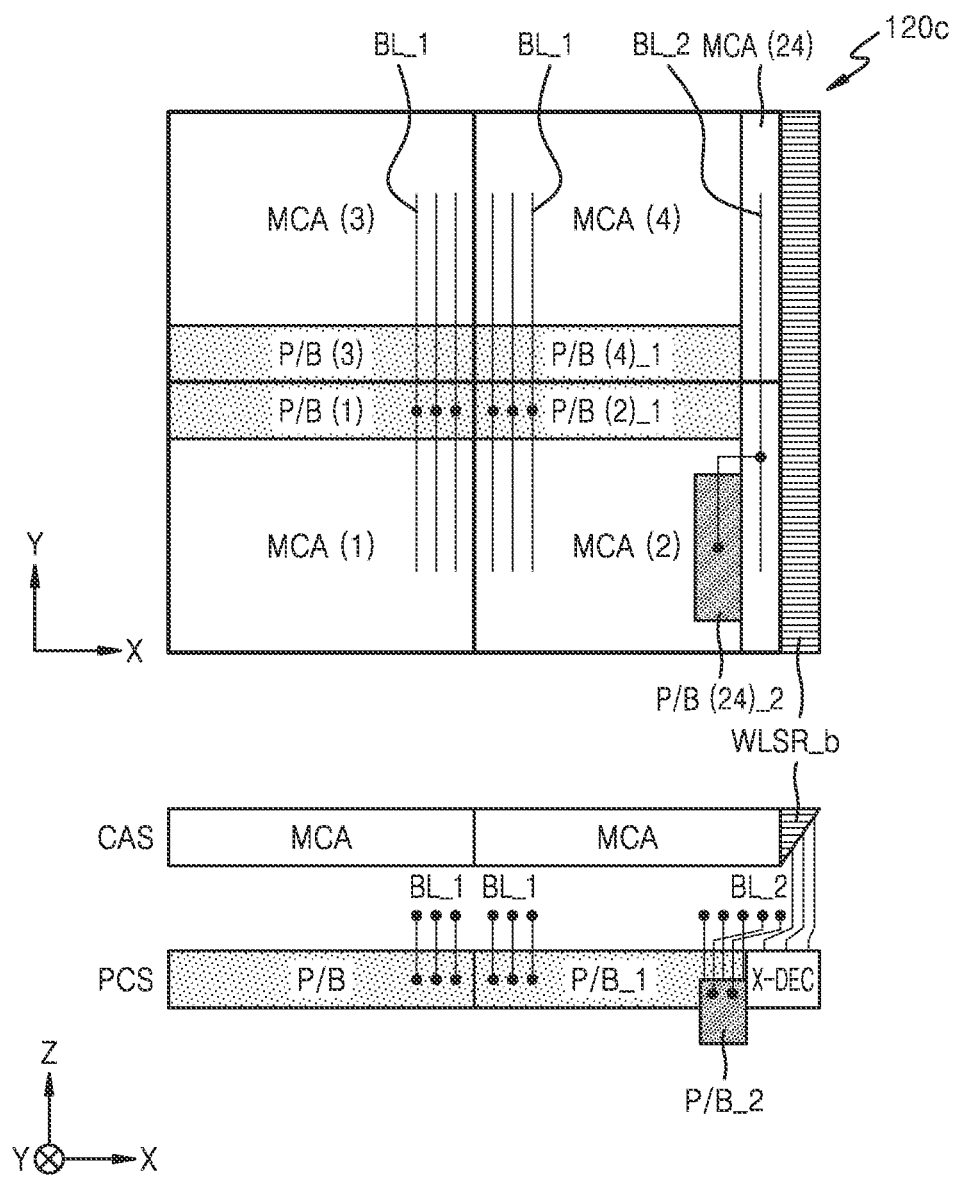

Referring to FIG. 10, a memory device 120c is different from the memory device 120b of FIG. 9 in that a word line step region WLSR_b of the memory cell arrays MCA 2 and MCA 4 is on one side of the cell array structure CAS in the X-axis direction. That is, in some embodiments, the word line step region WLSR_b of the memory cell arrays MCA 2 and MCA 4 may be on only one side of the cell array structure CAS in the X-axis direction. In addition, there is a difference in that the word line step region WLSR_b of the cell array structure CAS and a row decoder array X-DEC in the peripheral circuit structure PCS corresponding to a lower portion of the partial regions MCA(24) of the memory cell arrays MCA(2) and MCA(4) adjacent to the word line step regions WLSR_b are also on one edge in the X-axis direction. That is, in some embodiments, the word line step region WLSR_b of the cell array structure CAS and the row decoder array X-DEC in the peripheral circuit structure PCS corresponding to the lower portion of the partial regions MCA(24) of the memory cell arrays MCA(2) and MCA(4) adjacent to the word line step regions WLSR_b may be on only one edge in the X-axis direction.

The page buffer arrays P/B(1) and P/B(3) respectively connected to the memory cell arrays MCA(1) and MCA(3) may be connected to bit lines BL_1 of the memory cell arrays MCA(1) and MCA(3) as described with reference to FIG. 7. In some embodiments, the page buffer array P/B connected to the memory cell array MCA(2) may be divided into page buffer arrays P/B(2)_1 and P/B(24)_2. The page buffer array P/B(24)_2 may be connected to the bit lines BL_2 included in the memory cell region MCA(24) in the peripheral circuit structure PCS in which the row decoder array X-DEC is arranged, under the memory cell array MCA(2), and the page buffer array PB(2)_1 may be connected to the other bit lines BL_1 not included in the memory cell array MCA(24) of the memory cell array MCA(2). The page buffer array P/B connected to the memory cell array MCA(4) may be divided into page buffer arrays P/B(4)_1 and P/B(24)_2. The page buffer array P/B(24)_2 may be connected to the bit lines BL_2 included in the memory cell region MCA(24) in the peripheral circuit structure PCS, in which the row decoder array X-DEC is arranged, under the memory cell array MCA(4), and the page buffer array PB(4)_1 may be connected to the other bit lines BL_1 not included in the memory cell array MCA(24) of the memory cell array MCA(4). The bit lines BL_2 of the partial regions MCA(24) of the memory cell arrays MCA(2) and MCA(4) may be connected to the page buffer array P/B(24)_2. The page buffer array P/B(24)_2 may be in the peripheral circuit structure PCS corresponding to a lower portion of the memory cell array MCA(1). Accordingly, the page buffers P/B(2)_1 and PB(24)_2 of the memory cell array MCA(2) may be asymmetric to the page buffers P/B(4)_1 and PB(24)_2 of the memory cell array MCA(4).

Figure 11:
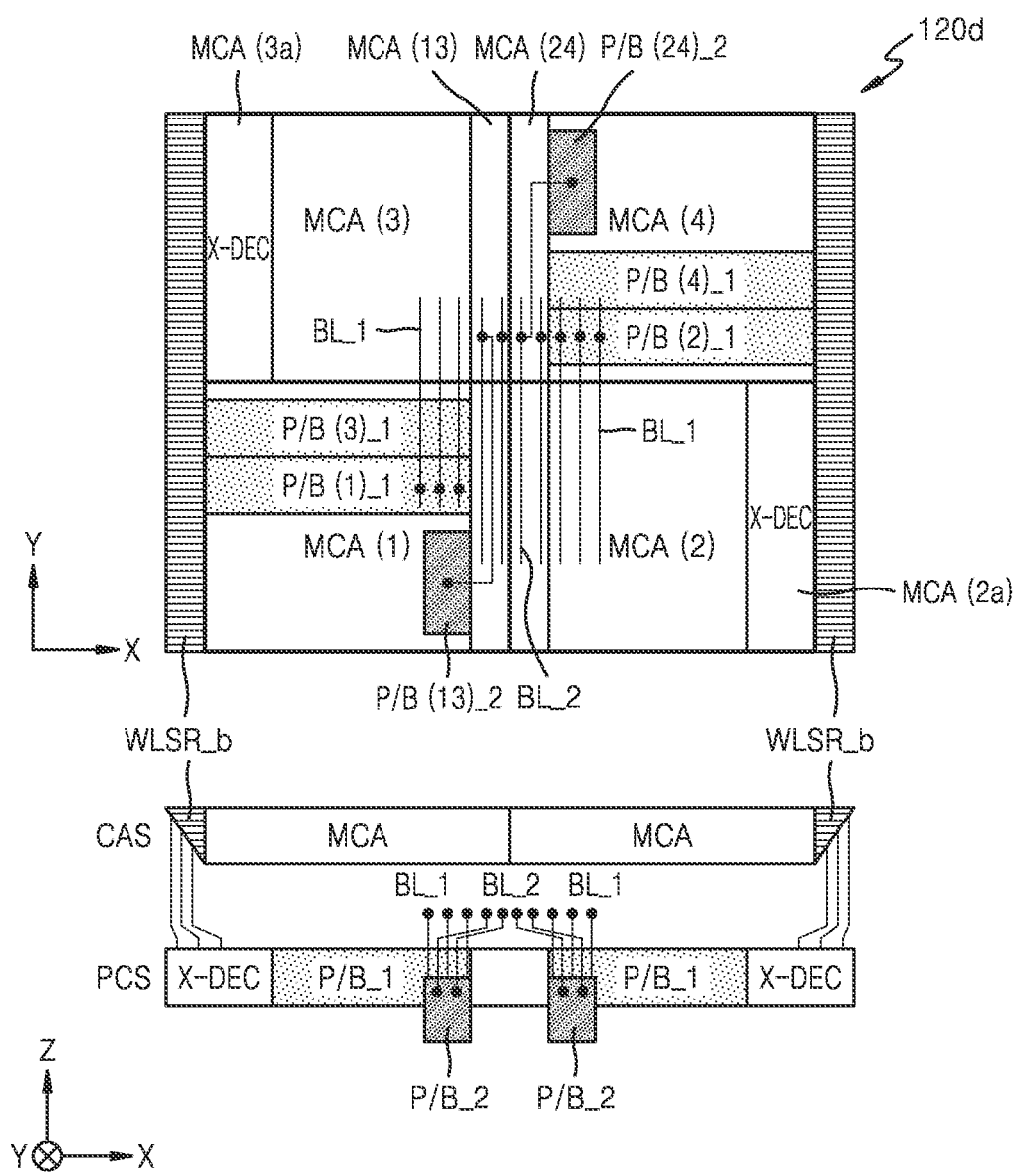

Referring to FIG. 11, a memory device 120d is different from the memory device 120b of FIG. 9 in that partial regions MCA(13) of memory cell arrays MCA(1) and MCA(3) connected to a page buffer array P/B(13)_2 and partial regions MCA(24) of memory cell arrays MCA(2) and MCA(4) connected to a page buffer array P/B(24)_2 are adjacent to each other in the central part of the length of the cell array structure CAS in the X-axis direction. In addition, row decoder arrays X-DEC are on both sides (i.e., opposite sides) of a cell array structure CAS in the X-axis direction, and the memory device 120d is different from the memory device 120b in that the row decoder arrays X-DEC are separated from each other in the peripheral circuit structure PCS corresponding to a word line step region WLSR_b of the memory cell array MCA(3) and a lower portion of a part of the memory cell array MCA(3) adjacent to the word line step region and a word line step region WLSR_b of the memory cell array MCA(2) and a lower portion of a part of the memory cell array MCA(2) adjacent to the word line step region WLSR_b. That is, page buffer arrays P/B(1)_1 and P/B(13)_2, P/B(2)_1, and P/B(24)_2 of the memory device 120d and the row decoder array X-DEC may be arranged in a windmill type.

The row decoder arrays X-DEC connected to the memory cell arrays MCA(1) and MCA(2) may be in the peripheral circuit structure PCS corresponding to the lower portion of a part of the memory cell array MCA(2), and the row decoder array X-DEC connected to the memory cell arrays MCA(3) and MCA(4) may be in the peripheral circuit structure PCS corresponding to a lower portion of a part of the memory cell array MCA(3).

The page buffer arrays P/B(1)_1, PB(3)_1, and P/B(13)_2 connected to the memory cell arrays MCA(1) and MCA(3) may be in a lower portion of the memory cell array MCA(1), and the page buffer arrays P/B(2)_1, PB(4)_1, and P/B(24)_2 connected to the memory cell arrays MCA(2) and MCA(4) may be in a lower portion of the memory cell array MCA(4) may be in the peripheral circuit structure PCS corresponding to the memory cell array MCA(4).

Accordingly, the page buffer arrays P/B(1)_1, P/B(2)_1, P/B(3)_1, P/B(4)_1, PB(13)_2, and P/B(24)_2 connected to the memory cell arrays MCA(1), MCA(2), MCA(3), and MCA(4) may be asymmetric to the row decoder array X-DEC in a windmill type.

Figure 12:
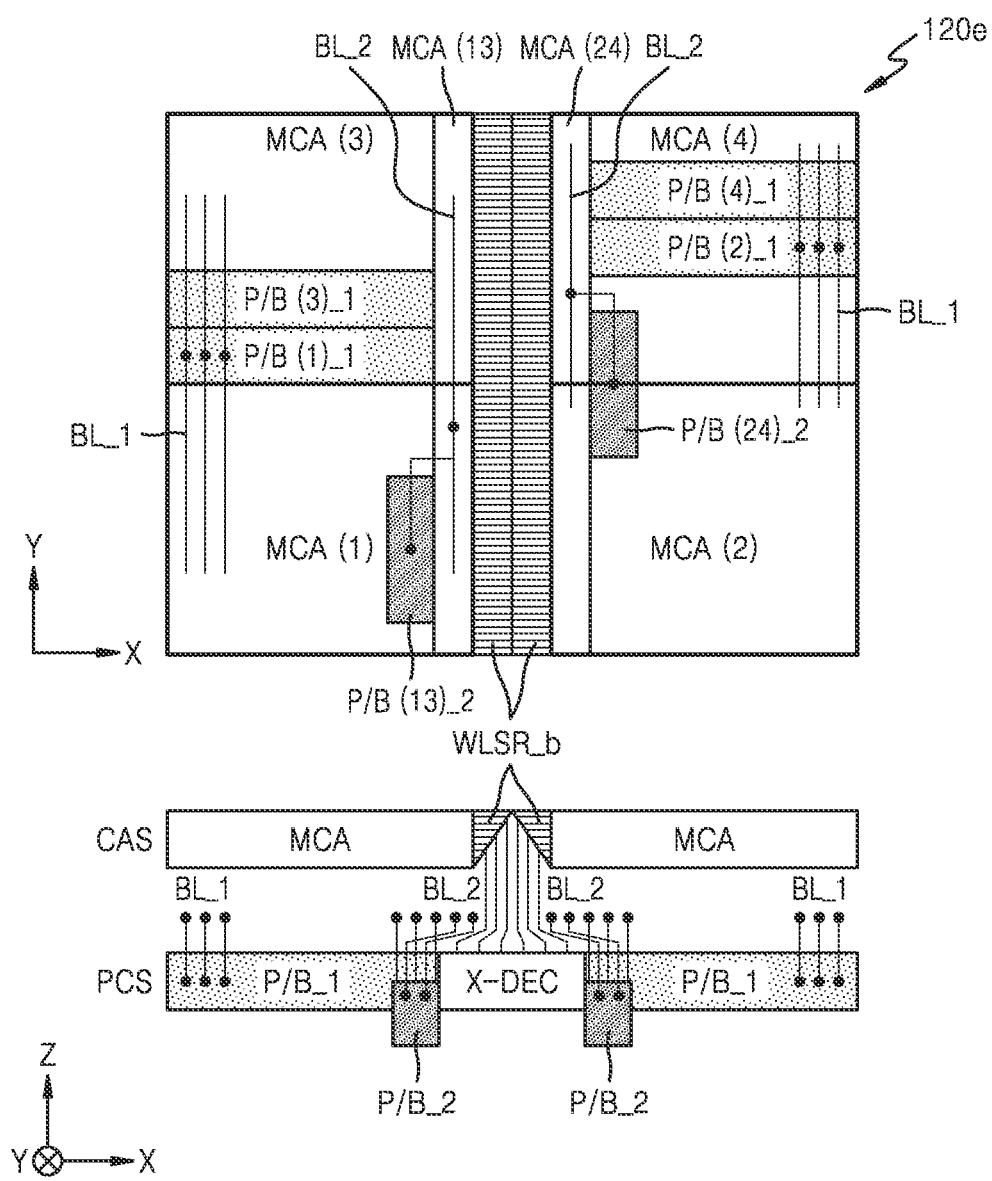

Referring to FIG. 12, a memory device 120e is different from the memory device 120a of FIG. 8 in that, in order to efficiently arrange, in the peripheral circuit structure PCS, peripheral circuits PERICKT included in the memory planes 121 to 124 excluding a page buffer array P/B and a row decoder array X-DEC, the page buffer arrays P/B(1)_1, P/B(2)_1, P/B(3)_1, P/B(4)_1, PB(13)_2, and P/B(24)_2 connected to the memory cell arrays MCA(1), MCA(2), MCA(3), and MCA(4) are asymmetric to each other.

In the memory device 120e, the page buffer array P/B(1)_1 connected to bit lines BL_1 in the memory cell array MCA(1) not included in the memory cell array MCA(13) and the page buffer array P/B(3)_1 connected to bit lines BL_1 in the memory cell array MCA(3) not included in the memory cell array MCA(13) may be in the peripheral circuit structure PCS corresponding to a lower portion of the memory cell array MCA(3). In the memory device 120e, the page buffer array P/B(2)_1 connected to bit lines BL_1 in the memory cell array MCA(2) not included in the memory cell array MCA(24) and the page buffer array P/B(4)_1 connected to bit lines BL_1 in the memory cell array MCA(4) not included in the memory cell array MCA(24) may be in the peripheral circuit structure PCS corresponding to a lower portion of the memory cell array MCA(4). In the memory device 120e, the page buffer array P/B(24)_2 connected to bit lines BL_2 in a partial region MCA(24) of the memory cell arrays MCA(2) and MCA(4) may be at the central part of the peripheral circuit structure PCS in the Y-axis direction corresponding to lower portions of the memory cell arrays MCA(2) and MCA(4).

Figure 13:
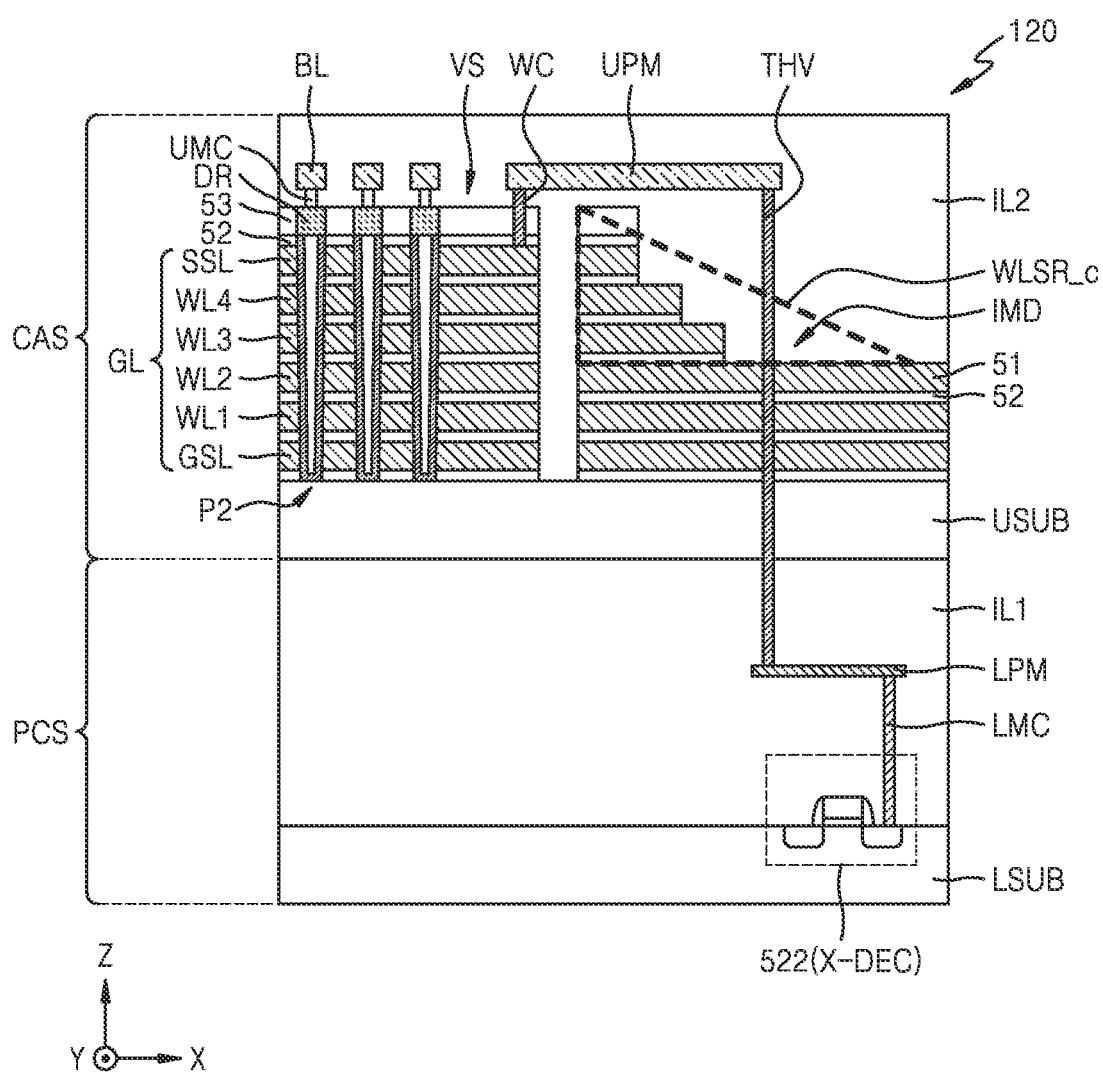
FIG. 13 is a partial cross-sectional view of a memory device according to embodiments.

FIG. 13 illustrates a partial cross-sectional view of a memory device according to embodiments.

Referring to FIG. 13, the memory device 120 may have a cell over periphery (COP) structure. The COP structure refers to a structure in which a peripheral circuit structure PCS including the peripheral circuit PERICKT described with reference to FIG. 1 is formed in a lower portion and a cell array structure CAS including a memory cell array MCA is stacked on the peripheral circuit structure PCS, that is, a structure in which the peripheral circuit structure PCS and the cell array structure CAS are stacked in the Z-axis direction.

The peripheral circuit structure PCS may include a lower substrate LSUB and a row decoder array X-DEC (522) formed on the lower substrate LSUB. The peripheral circuit structure PCS may include lower contacts LMC electrically connected to the row decoder array X-DEC, lower conductive lines LPM respectively electrically connected to the lower contacts LMC, and a lower insulating layer IL1 covering the lower contacts LMC and the lower conductive lines LPM. A row decoder array X-DEC may be formed in a partial region on the lower substrate LSUB. That is, a plurality of transistors may be formed in the lower substrate LSUB to constitute the row decoder DEC.

The cell array structure CAS may include an upper substrate USUB, a vertical structure VS on the upper substrate USUB, and an insulating mold structure IMD. The cell array structure CAS may include upper contacts UMC electrically connected to the vertical structure VS, bit lines BL, word line contacts WC, and upper conductive lines UPM. The cell array structure CAS may include through-hole vias THV formed in the insulating mold structure IMD and electrically connected to the word line contacts WC. The cell array structure CAS may include an upper insulating layer IL2 that covers the vertical structure VS, the insulating mold structure IMD, and various conductive lines.

The upper substrate USUB may be a support layer supporting a gate conductive layers GL. The vertical structure VS may include gate conductive layers GL on the upper substrate USUB and pillars P2 respectively passing through the gate conductive layers GL and extending in the Z-axis direction on an upper surface of the upper substrate USUB. The gate conductive layers GL may each include a ground select line GSL, word lines WL1 to WL4, and a string select line SSL. The ground select line GSL, the word lines WL1 to WL4, and the string select line SSL may be sequentially formed on the upper substrate USUB, and an interlayer insulating layer 52 may be formed under or over each of the gate conductive layers GL.

The pillars P2 may each include a surface layer and an interior. Specifically, the surface layer of the pillar P2 may include a silicon material doped with impurities or may include a silicon material not doped with impurities. The ground select line GSL and the surface layer of the pillar P2 adjacent to the ground select line GSL may constitute a ground select transistor (GST in FIG. 3). The word lines WL1 to WL4 and the surface layer of the pillar P2 adjacent to the word lines WL to WL may constitute memory cells (MC1 to MC4 in FIG. 3). The string select line SSL and the surface layer of the pillar P2 adjacent to the string select line SSL may constitute a string select transistor (SST in FIG. 3). A drain region DR may be formed on the pillar P2. For example, the drain region DR may be electrically connected to the bit line BL through the upper contact UMC. An etch stop layer 53 may be formed on a sidewall of the drain region DR. A top surface of the etch stop layer 53 may be formed on the same level as an upper surface of the drain region DR.

The insulating mold structure IMD may include sacrificial layers 51 and interlayer insulating layers 52 that are alternately stacked on the upper substrate USUB in a vertical Z-axis direction. Both the sacrificial layers 51 and the interlayer insulating layers 52 may be formed of insulating material and may include insulating materials with different properties. The through-hole vias THV may be formed in a planar section by passing through the insulation mold structure IMD.

In the vertical structure VS, a cross-section of an extension region of each of the word lines WL1 to WL4 may show a step shape on both sides of the memory cell array MCA in the X-axis direction. FIG. 13 illustrates a plurality of step regions WLSR_c formed in the insulating mold structure IMD on one side in the X-axis direction. Although not illustrated, a step region, in which cross sections of the word lines WL1 to WL4 connected to the word line contacts WC are similar to the word line step region WLSR_c described with reference to FIG. 6, may be on the other side in the X-axis direction.

FIGS. 14 to 18 illustrate memory devices according to various embodiments. A memory device 120f of FIG. 14 has the COP structure described with reference to FIG. 13 and is different from the memory device 120a of FIG. 8 in that a shape of a word line step region WLSR_c of the memory device 120f is opposite to a shape of the word line step region WLSR_b of the memory device 120a in the X-axis direction. Similarly, a memory device 120g of FIG. 15 includes the same components and configuration as the memory device 120b of FIG. 9 except that the word line step region WLSR_c has an opposite shape to a shape of the word line step region WLSR_b of the memory device 120b of FIG. 9. A memory device 120h of FIG. 16 includes the same components and configuration as the memory device 120c of FIG. 10 except that a word line step region WLSR_c has an opposite shape to a shape of the word line step region WLSR_b of the memory device 120c of FIG. 10. A memory device 120i of FIG. 17 includes the same components and configuration as the memory device 120d of FIG. 11 except that a word line step region WLSR_c has an opposite shape to a shape of the word line step region WLSR_b of the memory device 120d of FIG. 11. A memory device 120j of FIG. 18 includes the same components and configuration as and memory device 120e of FIG. 12 except that a word line step region WLSR_c has an opposite shape to a shape of the word line step region WLSR_b of the memory device 120e of FIG. 12.

Figure 14:
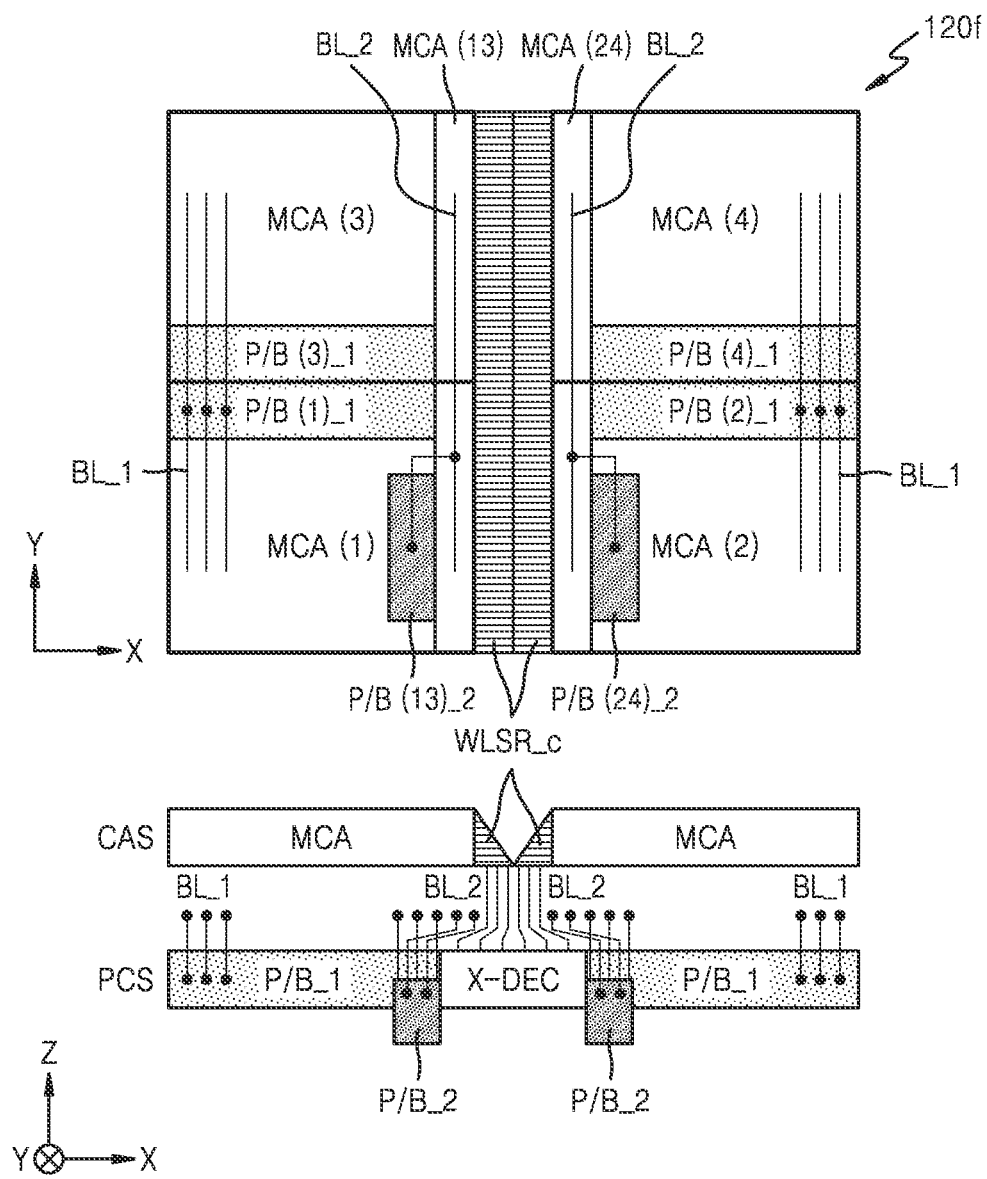
FIGS. 14 to 18 are views illustrating memory devices according to various embodiments.

Referring to FIG. 14, in the memory device 120f, a row decoder array X-DEC may be in a peripheral circuit structure PCS overlapping, in the Z-axis direction, the word line step region WLSR_c of the memory cell arrays MCA(1) and MCA(3), word line step regions WLSR_c of the memory cell arrays MCA(2) and MCA(4), partial regions MCA(13) of the memory cell arrays MCA(1) and MCA(3) adjacent to the word line step regions WLSR_c, and partial regions MCA(24) of the memory cell arrays MCA(2) and MCA(4) adjacent to the word line step regions WLSR_c.

In the memory device 120f, bit lines BL_2 of partial regions MCA(13) of the memory cell arrays MCA(1) and MCA(3) may be connected to a page buffer array P/B(13)_2, bit lines BL_1 in the memory cell region MCA(1) not included in the memory cell array MCA(13) may be connected to the page buffer array P/B(1)_1, and bit lines BL_1 in the memory cell region MCA(3) not included in the memory cell array MCA(13) may be connected to the page buffer array P/B(3)_1. The page buffer array P/B(13)_2 may overlap parts of the page buffer arrays P/B(1)_1 and P/B(3)_1 in the X-axis direction. The page buffer arrays P/B(1)_1 and P/B(3)_1 may overlap, in the X-axis direction, parts of central parts of lengths of the memory cell arrays MCA(1) and MCA(3) in the Y-axis direction.

In the memory device 120f, bit lines BL_2 of partial regions MCA(24) of the memory cell arrays MCA(2) and MCA(4) may be connected to a page buffer array P/B(24)_2, bit lines BL_1 in the memory cell region MCA(2) not included in the memory cell array MCA(24) may be connected to the page buffer array P/B(2)_1, and bit lines BL_1 in the memory cell region MCA(4) not included in the memory cell array MCA(24) may be connected to the page buffer array P/B(4)_1. The page buffer array P/B(24)_2 may overlap parts of the page buffer arrays P/B(2)_1 and P/B(4)_1 in the X-axis direction. The page buffer arrays P/B(2)_1 and P/B(4)_1 may overlap, in the X-axis direction, parts of central parts of lengths of the memory cell arrays MCA(2) and MCA(4) in the Y-axis direction.

Figure 15:
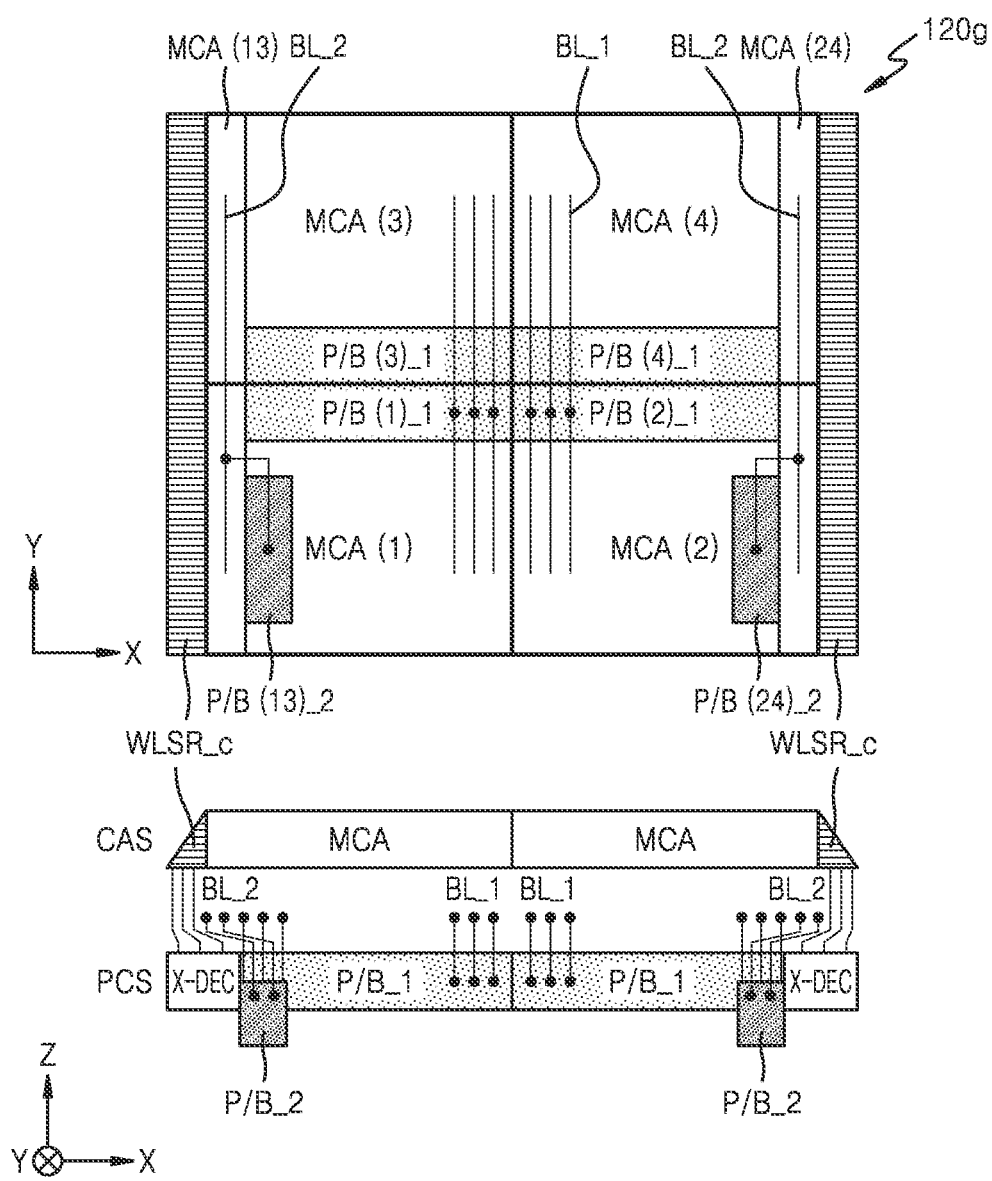

Referring to FIG. 15, in the memory device 120g, row decoder arrays X-DEC may be in a peripheral circuit structure PCS overlapping, in the Z-axis direction, word line step regions WLSR_c of the memory cell arrays MCA(1) and MCA(3) on both edges of a cell array structure CAS in the X-axis direction, partial regions MCA(13) of the memory cell arrays MCA(1) and MCA(3) adjacent to the word line step regions WLSR_c, and partial regions MCA 24 of the memory cell arrays MCA(2) and MCA(4) adjacent to the word line step regions WLSR_c. The row decoder arrays X-DEC may be on both edges of the cell array structure CAS in the X-axis direction.

In the memory device 120g, bit lines BL_2 in the partial regions MCA(13) of the memory cell arrays MCA(1) and MCA(3) may be connected to the page buffer array P/B(13)_2, bit lines BL_1 in the memory cell region MCA(1) not included in the memory cell array MCA(13) may be connected to the page buffer array P/B(1)_1, and bit lines BL_1 in the memory cell region MCA(3) not included in the memory cell array MCA(13) may be connected to the page buffer array P/B(1)_1. The page buffer array P/B(13)_2 may overlap parts of the page buffer arrays P/B(1)_1 and P/B(3)_1 in the X-axis direction. The page buffer arrays P/B(1)_1 and P/B(3)_1 may overlap, in the X-axis direction, parts of central parts of lengths of the memory cell arrays MCA(1) and MCA(3) in the Y-axis direction.

In the memory device 120g, bit lines BL_2 in the partial regions MCA(24) of the memory cell arrays MCA(2) and MCA(4) may be connected to the page buffer array P/B(24)_2, bit lines BL_1 in the memory cell region MCA(2) not included in the memory cell array MCA(24) may be connected to the page buffer array P/B(21)_1, and bit lines BL_1 in the memory cell region MCA(4) not included in the memory cell array MCA(24) may be connected to the page buffer array P/B(4)_1. The page buffer array P/B(24)_2 may overlap parts of the page buffer arrays P/B(2)_1 and P/B(4)_1 in the X-axis direction. The page buffer arrays P/B(2)_1 and P/B(4)_1 may overlap, in the X-axis direction, parts of central parts of lengths of the memory cell arrays MCA(2) and MCA(4) in the Y-axis direction.

Figure 16:
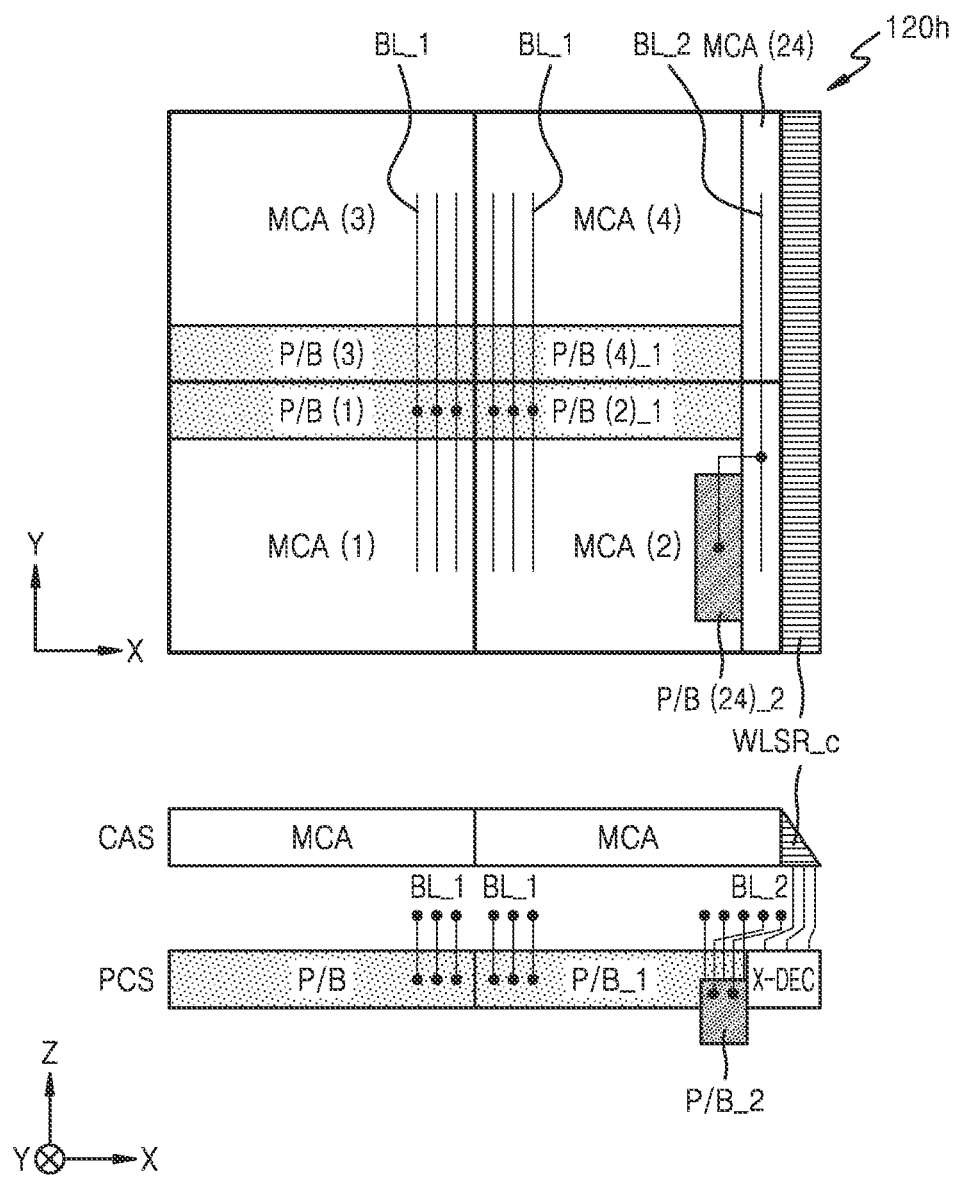

Referring to FIG. 16, in the memory device 120h, a row decoder array X-DEC may be in a peripheral circuit structure PCS overlapping, in the Z-axis direction, word line step regions WLSR_c of the memory cell arrays MCA(2) and MCA(4) on both edges of the cell array structure CAS in the X-axis direction and partial regions MCA(24) of the memory cell arrays MCA(2) and MCA(4) adjacent to the word line step regions WLSR_c. The row decoder array X-DEC may be on one edge of the cell array structure CAS in the X-axis direction.

In the memory device 120h, the bit lines BL_1 of the memory cell arrays MCA(1) and MCA(3) may be connected to the page buffer arrays P/B(1) and P/B(3). The page buffer arrays P/B(1) and P/B(3) may overlap, in the X-axis direction, parts of central parts of the memory cell arrays MCA(1) and MCA(3) in the Y-axis length.

In the memory device 120h, bit lines BL_2 in the partial regions MCA(24) of the memory cell arrays MCA(2) and MCA(4) may be connected to the page buffer array P/B(13)_2, bit lines BL_1 in the memory cell region MCA(2) not included in the memory cell array MCA(24) may be connected to the page buffer array P/B(2)_1, and bit lines BL_1 in the memory cell region MCA(4) not included in the memory cell array MCA(24) may be connected to the page buffer array P/B(4)_1. The page buffer array P/B(24)_2 may overlap parts of the page buffer arrays P/B(2)_1 and P/B(4)_1 in the X-axis direction. The page buffer arrays P/B(2)_1 and P/B(4)_1 may overlap, in the X-axis direction, parts of central parts of lengths of the memory cell arrays MCA(2) and MCA(4) in the Y-axis direction.

Figure 17:
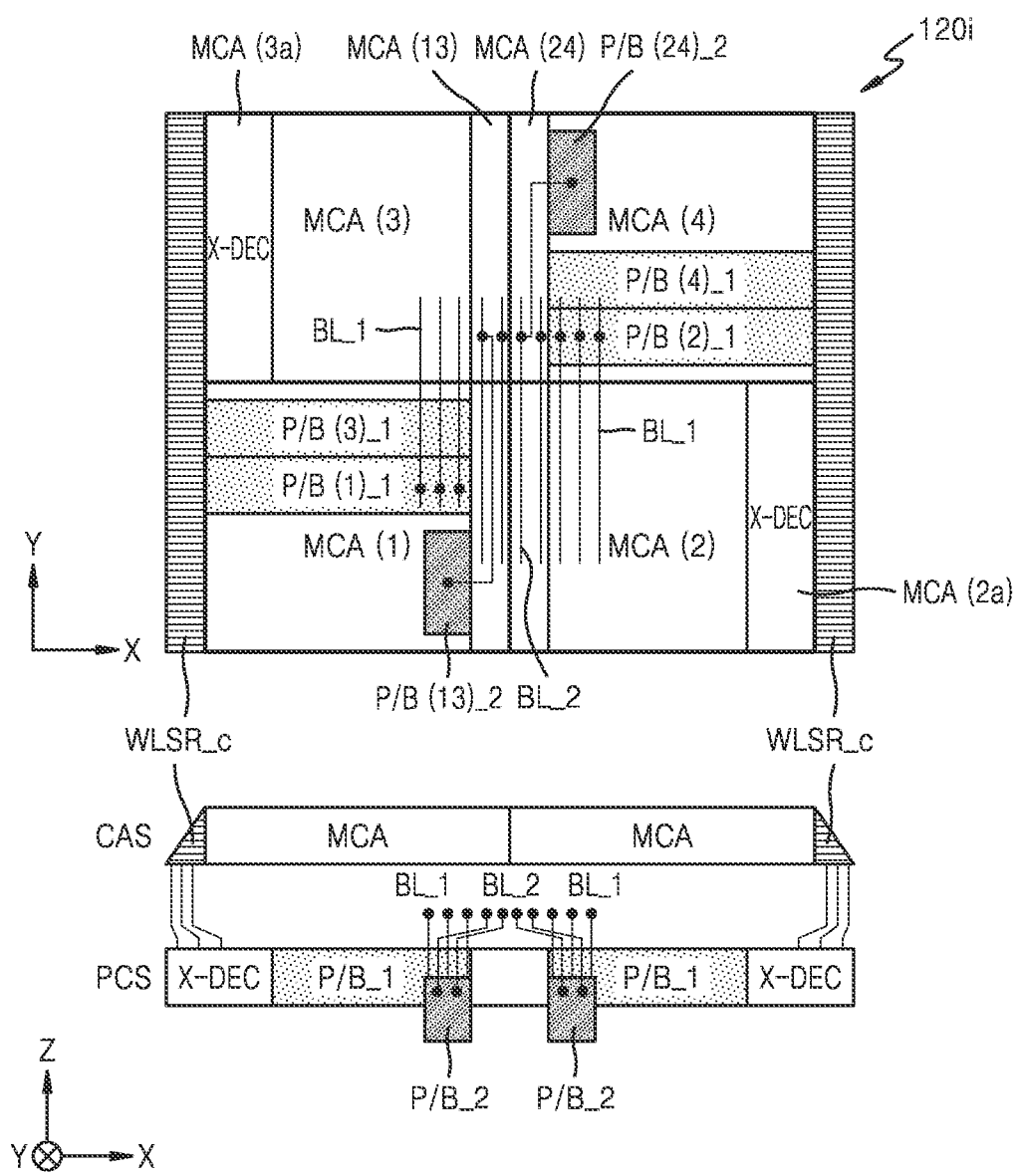

Referring to FIG. 17, in the memory device 120i, a row decoder array X-DEC may be in a peripheral circuit structure PCS overlapping, in the Z-axis direction, a word line step region WLSR_c of the memory cell array MCA(3) among word line step regions WLSR_c of the memory cell arrays MCA(1) and MCA(3) on both edges of the cell array structure CAS in the X-axis direction and a partial region MCA(3a) of the memory cell array MCA(3) adjacent to the word line step region WLSR_c of the memory cell array MCA(3). In addition, a row decoder array X-DEC may be in the peripheral circuit structure PCS overlapping, in the Z-axis direction, a word line step region WLSR_c of the memory cell arrays MCA(2) among word line step regions WLSR_c of the memory cell arrays MCA(2) and MCA(4) on both edges of the cell array structure CAS in the X-axis direction and a partial region MCA(2a) of the memory cell array MCA(2) adjacent to the word line step region WLSR_c of the memory cell array MCA(2).

In the memory device 120i, bit lines BL_2 in the partial regions MCA(13) of the memory cell arrays MCA(1) and MCA(3) may be connected to a page buffer array P/B(13)_2, bit lines BL_1 in the memory cell region MCA(1) not included in the memory cell array MCA(13) may be connected to a page buffer array P/B(1)_1, and bit lines BL_1 in the memory cell region MCA(3) not included in the memory cell array MCA(13) may be connected to the page buffer array P/B(1)_1. The page buffer array P/B(13)_2 may overlap parts of the page buffer arrays P/B(1)_1 and P/B(3)_1 in the X-axis direction. The page buffer arrays P/B(1)_1 and P/B(3)_1 may overlap, in the X-axis direction, a part of a length of the memory cell array MCA(1) in the Y-axis direction.

In the memory device 120i, bit lines BL_2 in the partial regions MCA(24) of the memory cell arrays MCA(2) and MCA(4) may be connected to a page buffer array P/B(24)_2, bit lines BL_1 in the memory cell region MCA(2) not included in the memory cell array MCA(24) may be connected to a page buffer array P/B(2)_1, and bit lines BL_1 in the memory cell region MCA(4) not included in the memory cell array MCA(24) may be connected to the page buffer array P/B(4)_1. The partial regions MCA(13) of the memory cell arrays MCA(1) and MCA(3) and the partial regions MCA(24) of the memory cell arrays MCA(2) and MCA(4) may be adjacent to each other in a central part of a length of a cell array structure CAS in the X-axis direction. The page buffer array P/B(24)_2 may overlap parts of the page buffer arrays P/B(2)_1 and P/B(4)_1 in the X-axis direction. The page buffer arrays P/B(2)_1 and P/B(4)_1 may overlap, in the X-axis direction, a part of a length of the memory cell array MCA(4) in the Y-axis direction.

In the memory device 120i, the page buffer array P/B(1)_1 and P/B(3)_1, the row decoder array X-DEC, and the page buffer array P/B(2)_1 and P/B(4)_1 may be arranged in a windmill type in the peripheral circuit structure PCS of a vertical lower region of the memory cell arrays MCA(1), MCA(2), MCA(3), and MCA(4).

Figure 18:
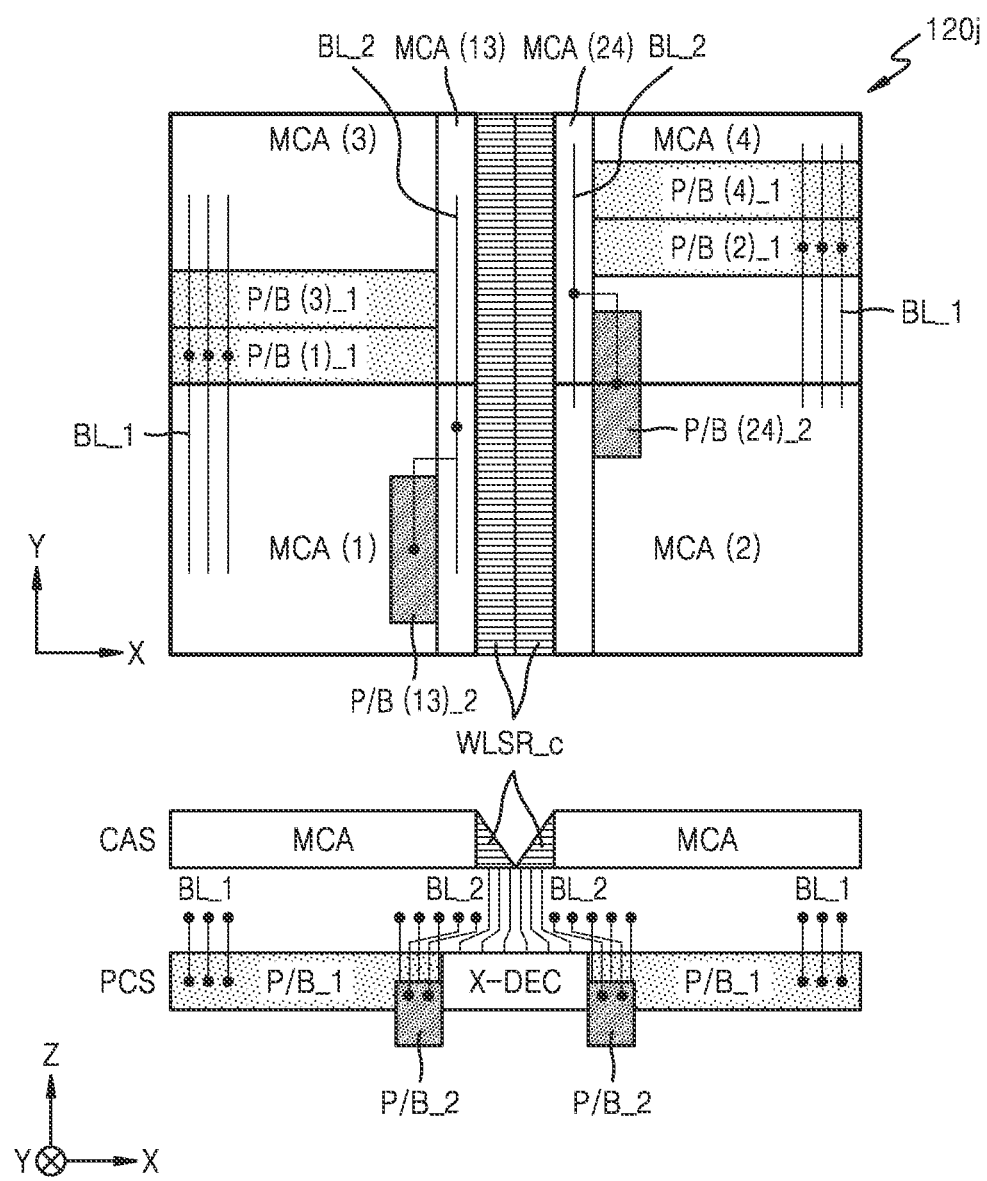

Referring to FIG. 18, in the memory device 120j, a row decoder array X-DEC may be in a peripheral circuit structure PCS overlapping, in the Z-axis direction, word line step regions WLSR_c of the memory cell arrays MCA(1) and MCA(3), word line step regions WLSR_c of the memory cell arrays MCA(2) and MCA(4), a partial region MCA(13) of the memory cell arrays MCA(1) and MCA(3) adjacent to the word line step region WLSR_c, and partial regions MCA(24) of the memory cell arrays MCA(2) and MCA(4) adjacent to the word line step region WLSR_c.

In the memory device 120j, bit lines BL_2 in the partial regions MCA(13) of the memory cell arrays MCA(1) and MCA(3) may be connected to a page buffer array P/B(13)_2, bit lines BL_1 in the memory cell region MCA(1) not included in the memory cell array MCA(13) may be connected to a page buffer array P/B(1)_1, and bit lines BL_1 in the memory cell region MCA(3) not included in the memory cell array MCA(13) may be connected to the page buffer array P/B(3)_1. The page buffer arrays P/B(1)_1 and P/B(3)_1 may overlap, in the X-axis direction, a part of the length of the memory cell array MCA(3) in the Y-axis direction. The page buffer array P/B(13)_2 may overlap parts of the page buffer arrays P/B(1)_1 and P/B(3)_1 in the X-axis direction and may overlap a partial region of the memory cell array MCA(3).

In the memory device 120j, bit lines BL_2 in the partial regions MCA(24) of the memory cell arrays MCA(2) and MCA(4) may be connected to a page buffer array P/B(24)_2, bit lines BL_1 in the memory cell region MCA(2) not included in the memory cell array MCA(24) may be connected to a page buffer array P/B(2)_1, and bit lines BL_1 in the memory cell region MCA(4) not included in the memory cell array MCA(24) may be connected to the page buffer array P/B(4)_1. The page buffer arrays P/B(2)_1 and P/B(4)_1 may overlap, in the X-axis direction, parts of central parts of lengths of the memory cell arrays MCA(2) and MCA(4) in the Y-axis direction. The page buffer array P/B(24)_2 may overlap parts of the page buffer arrays P/B(2)_1 and P/B(4)_1 in the X-axis direction and may overlap partial regions of the memory cell arrays MCA(2) and MCA(4).

Figure 19:
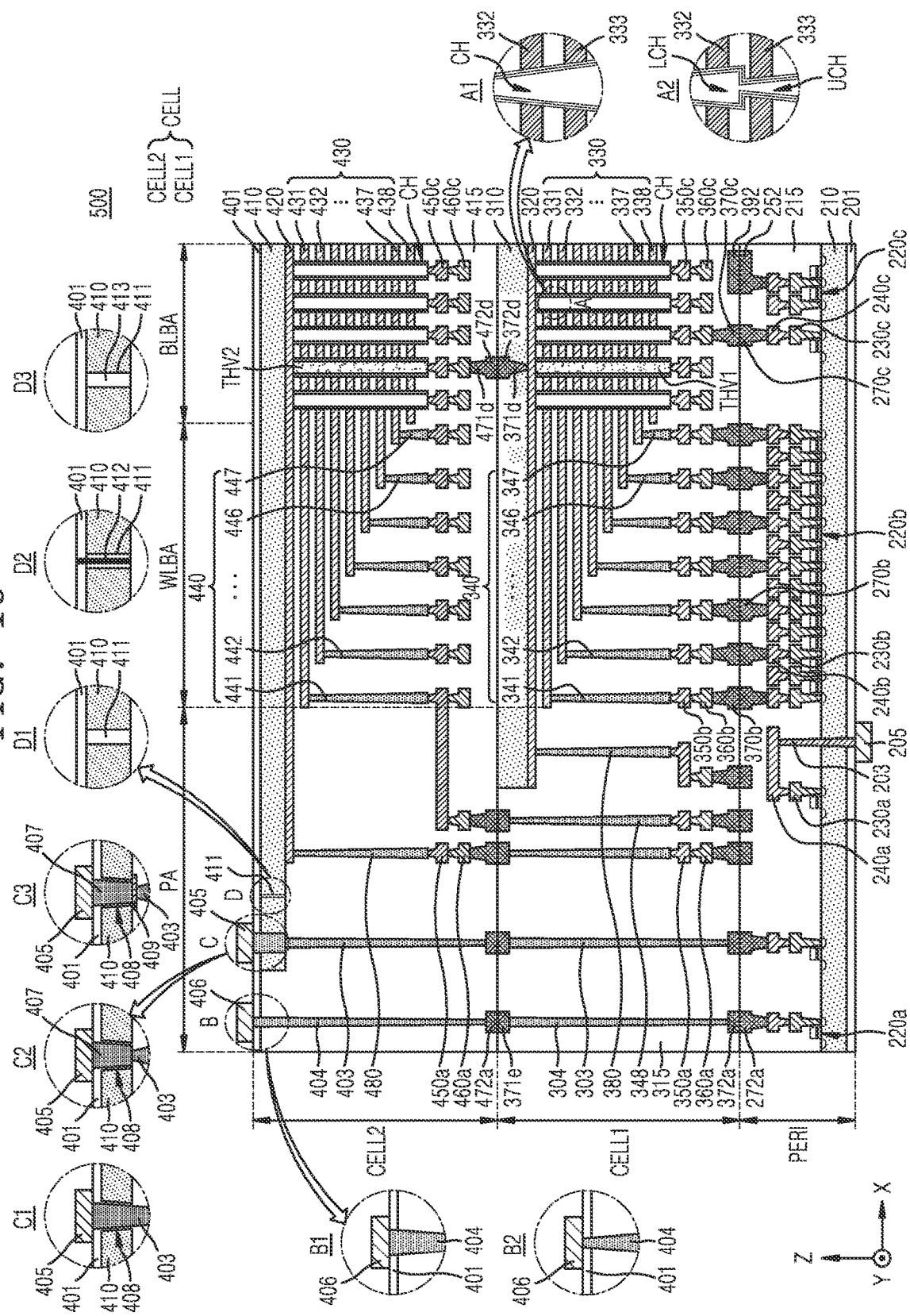
FIG. 19 is a cross-sectional view of a memory device having a B-VNAND structure, according to embodiments.

FIG. 19 is a cross-sectional view of a memory device 500 having a B-VNAND structure, according to an embodiment.

Referring to FIG. 19, the memory device 500 may have a chip-to-chip (C2C) structure. The C2C structure may refer to a structure formed by manufacturing an upper chip including a cell region CELL on a first wafer, manufacturing a lower chip including a peripheral circuit region PERI on a second wafer, different from the first wafer, and then connecting the upper chip and the lower chip in a bonding manner. For example, the bonding manner may include a method of electrically connecting a bonding metal formed on an uppermost metal layer of the upper chip and a bonding metal formed on an uppermost metal layer of the lower chip. For example, when the bonding metals may be formed of copper (Cu), the bonding manner may be a Cu—Cu bonding, and the bonding metals may also be formed of aluminum or tungsten.

Each of the peripheral circuit region PERI and the cell region CELL of the memory device 500 may include an external pad bonding region PA, a word line bonding region WLBA, and a bit line bonding region BLBA. In some embodiments, the cell region CELL may include a first cell region CELL1 and a second cell region CELL2.

The peripheral circuit region PERI may include a first substrate 210, an interlayer insulating layer 215, a plurality of circuit elements 220a, 220b, and 220c formed on the first substrate 210, first metal layers 230a, 230b, and 230c respectively connected to the plurality of circuit elements 220a, 220b, and 220c, and second metal layers 240a, 240b, and 240c formed on the first metal layers 230a, 230b, and 230c. In an embodiment, the first metal layers 230a, 230b, and 230c may be formed of tungsten having relatively high resistance, and the second metal layers 240a, 240b, and 240c may be formed of copper having relatively low resistance.

In an embodiment illustrated in FIG. 19, although the first metal layers 230a, 230b, and 230c and the second metal layers 240a, 240b, and 240c are shown and described, embodiments are not limited thereto, and, in some embodiments, one or more metal layers may be further formed on the second metal layers 240a, 240b, and 240c. At least a portion of the one or more metal layers formed on the second metal layers 240a, 240b, and 240c may be formed of aluminum or the like having a lower resistance than those of copper forming the second metal layers 240a, 240b, and 240c.

The interlayer insulating layer 215 may be disposed on the first substrate 210 and cover the plurality of circuit elements 220a, 220b, and 220c, the first metal layers 230a, 230b, and 230c, and the second metal layers 240a, 240b, and 240c. The interlayer insulating layer 215 may include an insulating material such as silicon oxide, silicon nitride, or the like.

Lower bonding metals 270b may be formed on the second metal layer 240b in the word line bonding region WLBA. In the word line bonding region WLBA, the lower bonding metals 270b in the peripheral circuit region PERI may be electrically connected to upper bonding metals 370b in the cell region CELL in a bonding manner, and the lower bonding metals 270b and the upper bonding metals 370b may be formed of aluminum, copper, tungsten, or the like.

The cell region CELL may include at least one memory block. The cell region CELL may include a second substrate 310 and a common source line 320. On the second substrate 310, a plurality of word lines 331 to 338 (i.e., 330) may be stacked in a direction (a Z-axis direction), perpendicular to an upper surface of the second substrate 310. At least one string select line and at least one ground select line may be arranged on and below the plurality of word lines 330, respectively, and the plurality of word lines 330 may be disposed between the at least one string select line and the at least one ground select line.

In the bit line bonding region BLBA, a channel structure CH may extend in a direction perpendicular to the upper surface of the second substrate 310, and pass through the plurality of word lines 330, the at least one string select line, and the at least one ground select line. The channel structure CH may include a data storage layer, a channel layer, a buried insulating layer, and the like, and the channel layer may be electrically connected to a first metal layer 350c and a second metal layer 360c. For example, the first metal layer 350c may be a bit line contact, and the second metal layer 360c may be a bit line. In an embodiment, the bit line 360c may extend in a first direction (a Y-axis direction), parallel to the upper surface of the second substrate 310.

In an embodiment illustrated in FIG. 19, an region in which the channel structure CH, the bit line 360c, and the like are disposed may be defined as the bit line bonding region BLBA. In the bit line bonding region BLBA, the bit line 360c may be electrically connected to the circuit elements 220c providing a page buffer P/B in the peripheral circuit region PERI. For example, the bit line 360c may be connected to upper bonding metals 370c in the cell region CELL, and the upper bonding metals 370c may be connected to lower bonding metals 270c connected to the circuit elements 220c of the page buffer 393.

In the word line bonding region WLBA, the plurality of word lines 330 may extend in a second direction (an X-axis direction), parallel to the upper surface of the second substrate 310, and may be connected to a plurality of cell contact plugs 341 to 347 (i.e., 340). The plurality of word lines 330 and the plurality of cell contact plugs 340 may be connected to each other in pads provided by at least a portion of the plurality of word lines 330 extending in different lengths in the second direction. A first metal layer 350b and a second metal layer 360b may be connected to an upper portion of the plurality of cell contact plugs 340 connected to the plurality of word lines 330, sequentially. The plurality of cell contact plugs 340 may be connected to the circuit region PERI by the upper bonding metals 370b of the cell region CELL and the lower bonding metals 270b of the peripheral circuit region PERI in the word line bonding region WLBA.

The plurality of cell contact plugs 340 may be electrically connected to the circuit elements 220b providing a row decoder DEC in the peripheral circuit region PERI. In an embodiment, operating voltages of the circuit elements 220b providing the row decoder DEC may be different than operating voltages of the circuit elements 220c providing the page buffer P/B. For example, operating voltages of the circuit elements 220c providing the page buffer P/B may be greater than operating voltages of the circuit elements 220b providing the row decoder DEC.

A common source line contact plug 380 may be disposed in the external pad bonding region PA. The common source line contact plug 380 may be formed of a conductive material such as a metal, a metal compound, polysilicon, or the like, and may be electrically connected to the common source line 320. A first metal layer 350a and a second metal layer 360a may be stacked on an upper portion of the common source line contact plug 380, sequentially. For example, an region in which the common source line contact plug 380, the first metal layer 350a, and the second metal layer 360a are disposed may be defined as the external pad bonding region PA.

Input-output pads 205 may be disposed in the external pad bonding region PA. Referring to FIG. 19, a lower insulating film 201 covering a lower surface of the first substrate 210 may be formed below the first substrate 210, and a first input-output pad 205 may be formed on the lower insulating film 201. The first input-output pad 205 may be connected to at least one of the plurality of circuit elements 220a, 220b, and 220c disposed in the peripheral circuit region PERI through a first input-output contact plug 203, and may be separated from the first substrate 210 by the lower insulating film 201. In some embodiments, a side insulating film may be disposed between the first input-output contact plug 203 and the first substrate 210 to electrically separate the first input-output contact plug 203 and the first substrate 210.

Referring to FIG. 19, in some embodiments, an upper insulating film covering the upper surface of the second substrate 310 may be formed on the second substrate 310, and a second input-output pad may be disposed on the upper insulating layer. The second input-output pad may be connected to at least one of the plurality of circuit elements 220a, 220b, and 220c disposed in the peripheral circuit region PERI through a second input-output contact plug.

According to embodiments, the second substrate 310 and the common source line 320 may not be disposed in an region in which the second input-output contact plug is disposed. Also, the second input-output pad may not overlap the word lines 330 in the third direction (the Z-axis direction). Referring to FIG. 19, the second input-output contact plug may be separated from the second substrate 310 in a direction, parallel to the upper surface of the second substrate 310, and may pass through an interlayer insulating layer 315 of the cell region CELL to be connected to the second input-output pad.

According to embodiments, the first input-output pad 205 and the second input-output pad may be selectively formed. For example, the memory device 500 may include only the first input-output pad 205 disposed on the first substrate 210 or the second input-output pad disposed on the second substrate 310. In some embodiments, the memory device 500 may include both the first input-output pad 205 and the second input-output pad.

A metal pattern in an uppermost metal layer may be provided as a dummy pattern or the uppermost metal layer may be absent, in each of the external pad bonding region PA and the bit line bonding region BLBA, respectively included in the cell region CELL and the peripheral circuit region PERI.

In the external pad bonding region PA, the memory device 500 may include a lower metal pattern 272a, corresponding to an upper metal pattern 372a formed in an uppermost metal layer of the cell region CELL, and having the same shape as the upper metal pattern 372a of the cell region CELL, in an uppermost metal layer of the peripheral circuit region PERI. In some embodiments, the peripheral circuit region PERI, the lower metal pattern 272a formed in the uppermost metal layer of the peripheral circuit region PERI may not be connected to a contact. Similarly, in the external pad bonding region PA, an upper metal pattern, corresponding to the lower metal pattern formed in an uppermost metal layer of the peripheral circuit region PERI, and having the same shape as a lower metal pattern of the peripheral circuit region PERI, may be formed in an uppermost metal layer of the cell region CELL.

The lower bonding metals 270b may be formed on the second metal layer 240b in the word line bonding region WLBA. In the word line bonding region WLBA, the lower bonding metals 270b of the peripheral circuit region PERI may be electrically connected to the upper bonding metals 370b of the cell region CELL by a Cu—Cu bonding.

Further, the bit line bonding region BLBA, an upper metal pattern 392, corresponding to a lower metal pattern 252 formed in the uppermost metal layer of the peripheral circuit region PERI, and having the same shape as the lower metal pattern 252 of the peripheral circuit region PERI, may be formed in an uppermost metal layer of the cell region CELL. A contact may not be formed on the upper metal pattern 392 formed in the uppermost metal layer of the cell region CELL.

In an embodiment, corresponding to a metal pattern formed in an uppermost metal layer in one of the cell region CELL and the peripheral circuit region PERI, a reinforcement metal pattern having the same shape as the metal pattern may be formed in an uppermost metal layer in another one of the cell region CELL and the peripheral circuit region PERI, and a contact may not be formed on the reinforcement metal pattern.

Figure 20:
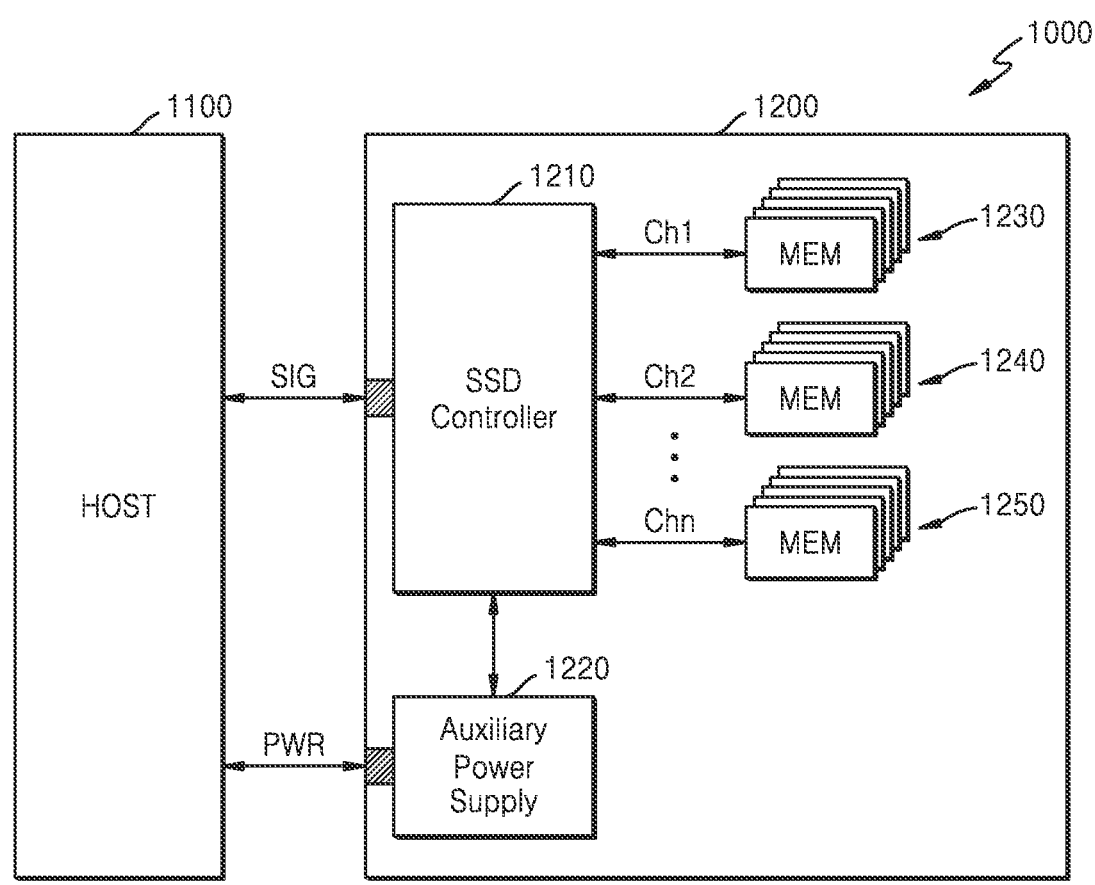
FIG. 20 is a block diagram illustrating an example in which a memory device is applied to a solid state drive (SSD) system, according to embodiments.

FIG. 20 is a block diagram illustrating an example in which a memory device is applied to an SSD system 1000, according to embodiments.

Referring to FIG. 20, the SSD system 1000 may include a host 1100 and a solid state device (SSD) 1200. The SSD 1200 may exchange signals with the host 1100 through a signal connector and receive power through a power connector. The SSD 1200 may include an SSD controller 1210, an auxiliary power supply 1220, and memory devices 1230, 1240, and 1250. The memory devices 1230, 1240, and 1250 may be vertically stacked NAND flash memory devices. In this case, the SSD 1200 may be implemented by using the embodiments described with reference to FIGS. 1 to 19. That is, the SSD 1200 may be implemented as the memory system 100 described with reference to FIGS. 1 to 19.

Figure 21:
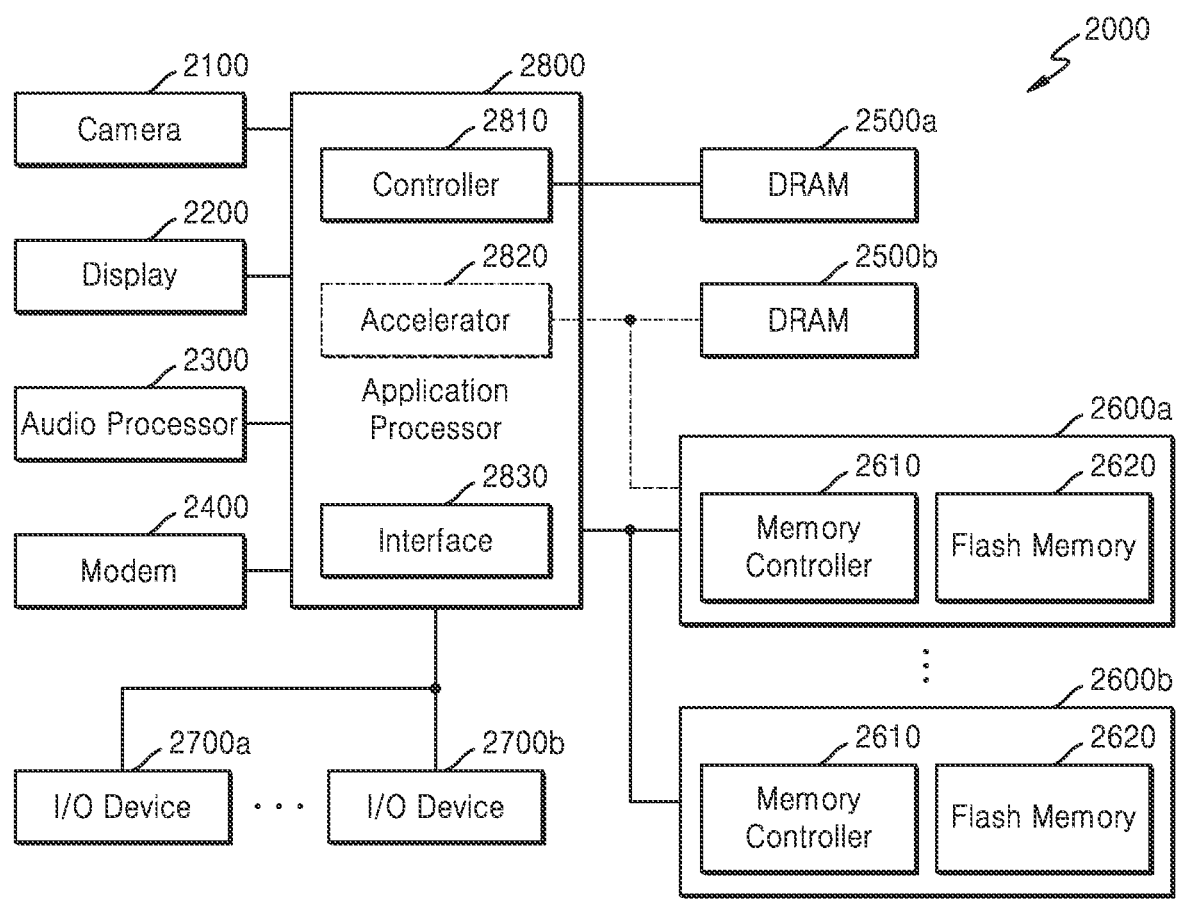
FIG. 21 is a block diagram of a system illustrating an electronic device including a memory device, according to embodiments.

FIG. 21 is a block diagram of a system 2000 for describing an electronic device including a memory device, according to embodiments.

Referring to FIG. 21, the system 2000 may include a camera 2100, a display 2200, an audio processor 2300, a modem 2400, DRAMs 2500a and 2500b, flash memory devices 2600a and 2600b, input/output (I/O) devices 2700a and 2700b, and an application processor 2800 (hereinafter referred to as an "AP"). The system 2000 may be implemented as a laptop computer, a mobile phone, a smartphone, a tablet personal computer (PC), a wearable device, a healthcare device, or an Internet of things (IOT) device. In some embodiments, the system 2000 may be implemented as a server or a PC.

The camera 2100 may capture a still image or a moving image by user control and may store or transmit the captured image and/or video data to the display 2200. The audio processor 2300 may process audio data stored in the flash memory devices 2600a and 2600b or included in contents of a network. The modem 2400 may modulate a signal for transmission/reception of wired/wireless data, transmit the modulated signal, and demodulate a received signal to restore an original signal at the reception side. The I/O devices 2700a and 2700b may include devices that provide a digital input and/or output function, such as a universal serial bus (USB), a storage, a digital camera, a secure digital (SD) card, a digital versatile disc (DVD), a network adapter, or a touch screen.

The AP 2800 may control all operations of the system 2000. The AP 2800 may include a control block 2810, an accelerator block or accelerator chip 2820, and an interface block 2830. The AP 2800 may control the display 2200 to display some of contents stored in the flash memory devices 2600a and 2600b on the display 2200. When a user input is received through the I/O devices 2700a and 2700b, the AP 2800 may perform a control operation corresponding to the user input. The AP 2800 may include an accelerator block, which is a dedicated circuit for artificial intelligence (AI) data calculation or may include the accelerator chip 2820 separate from the AP 2800. The DRAM 2500b may be additionally mounted on the accelerator block or the accelerator chip 2820. An accelerator may be a functional block that specializes in performing a certain function of the AP 2800 and may include a graphics processing unit (GPU) which is a functional block specialized in processing graphics data, a neural processing unit (NPU) which is a block specialized in performing AI calculations and inference, and a data processing unit (DPU) which is a block specialized in data transmission.

The system 2000 may include a plurality of DRAMs 2500a and 2500b. The AP 2800 may control the DRAMs 2500a and 2500b through command signals and mode register setting (MRS) conforming to the joint electron device engineering council (JEDEC) standard or may perform communication by setting a DRAM interface protocol to use company's unique functions, such as a low voltage, a high speed, and reliability, and cyclic redundancy check (CRC)/error correction code (ECC) functions. For example, the AP 2800 may communicate with the DRAM 2500a with an interface conforming to the JEDEC standard, such as LPDDR4 and LPDDR5, and an accelerator block or the accelerator chip 2820 may perform communication by setting a new DRAM interface protocol to control the DRAM 2500b for an accelerator having a higher bandwidth than the DRAM 2500a.

Although FIG. 21 illustrates only the DRAMs 2500a and 2500b, embodiments are not limited thereto, and any memory device, such as PRAM, static RAM (SRAM), MRAM, resistance RAM (RAM), ferroelectric RAM (FRAM), or hybrid RAM may be used therefor, when a bandwidth, a response speed, and voltage conditions of the AP 2800 or the accelerator chip 2820 are satisfied. The DRAMs 2500a and 2500b have relatively smaller latency and bandwidth than the I/O devices 2700a and 2700b or the flash memory devices 2600a and 2600b. The DRAMs 2500a and 2500b may be initialized when the system 2000 is powered on and loaded with operating systems and application data to be used as temporary storages of the operating systems and application data or used as execution spaces for various software codes.

The DRAMs 2500a and 2500b may perform addition/subtraction/multiplication/division operations, vector calculations, address operations, or fast Fourier transform (FFT) operations. In addition, a function for execution that is used for inference may be performed in the DRAMs 2500a and 2500b. Here, the inference may be performed by a deep learning algorithm using an artificial neural network. The deep learning algorithm may include a training step of learning a model through various data and an inference step of recognizing data by using the learned model. In an embodiment, an image captured by a user through the camera 2100 is signal-processed and stored in the DRAM 2500b, and an accelerator block or the accelerator chip 2820 may perform AI data calculation that recognizes data by using a function that is used is used for data stored in the DRAM 2500*b* and inference.

The system 2000 may include a plurality of storages or a plurality of flash memory devices 2600*a* and 2600*b* having a larger capacity than the DRAMs 2500*a* and 2500*b*. The accelerator block or accelerator chip 2820 may perform training and AI data calculation by using the flash memory devices 2600*a* and 2600*b*. In one embodiment, the flash memory devices 2600*a* and 2600*b* may each include a memory controller 2610 and a flash memory 2620, and may each perform more efficiently training and an inference AI data calculation performed by the AP 2800 and/or the accelerator chip 2820 by using an arithmetic unit included in the memory controller 2610. The flash memory devices 2600*a* and 2600*b* may store photos taken through the camera 2100 or data transmitted through a data network. For example, the flash memory devices 2600*a* and 2600*b* may store augmented reality/virtual reality and high definition (HD) or ultrahigh definition (UHD) contents.

In system 2000, the flash memory devices 2600*a* and 2600*b* may each include the memory devices described with reference to FIGS. 1 to 18. The memory device may include a memory cell array in which each of a plurality of memory planes is included in a cell array structure and include a row decoder array and a page buffer array included in a peripheral circuit structure vertically overlapped with the cell array structure. A row decoder array connected to each of a plurality of memory planes may be buried in a region vertically overlapping a word line step region of a cell array structure and a partial region of a memory cell array adjacent to the word line step region to be provided in a peripheral circuit structure, and a page buffer array may be divided into a first page buffer array connected to bit lines of the partial region of the memory cell array in which the row decoder array is buried and a second page buffer array connected to bit lines not included in the partial region such that the first page buffer and the second page buffer are in the peripheral circuit structure to be asymmetric to each other, and thus, a memory chip size may be reduced. Also, even though the number of word lines stacked in a cell array structure increases, a row decoder array buried in a word line step region and a partial region of a memory cell array may be reduced without affecting a memory chip size, and thus, capacities of memory blocks may be increased.

While various embodiments have been particularly shown and described with reference to the drawings, it will be understood that various changes in form and details may be made therein without departing from the spirit and scope of the following claims.

What is claimed is:

1. A memory device comprising:
   a plurality of memory planes that each includes a memory cell array including a plurality of non-volatile memory cells, a row decoder array connected to the plurality of non-volatile memory cells included in the memory cell array through a plurality of word lines extending in a first horizontal direction, and a page buffer array connected to the plurality of non-volatile memory cells included in the memory cell array through a plurality of bit lines extending in a second horizontal direction crossing the first horizontal direction;
   a peripheral circuit structure including the row decoder array included in each of the plurality of memory planes and the page buffer array included in each of the plurality of memory planes; and
   a cell array structure on the peripheral circuit structure, the cell array structure overlapping the peripheral circuit structure in a vertical direction on the peripheral circuit structure, wherein the cell array structure includes the memory cell array of each of the plurality of memory planes, and a word line step region in which the plurality of word lines extend parallel to each other in the first horizontal direction and the second horizontal direction and overlap each other in the vertical direction,
   wherein, in each of the plurality of memory planes, the page buffer array is divided into a page buffer array connected to bit lines of a partial region of the memory cell array that overlaps a part of the row decoder array in the vertical direction and a page buffer array connected to other bit lines not included in the partial region.

2. The memory device of claim 1, wherein:
   the plurality of memory planes include a first memory plane and a second memory plane adjacent to the first memory plane in the second horizontal direction, and
   a first row decoder array of each of the first memory plane and the second memory plane is in the peripheral circuit structure that overlaps a first word line step region of each of the first memory plane and the second memory plane and a first partial region of the memory cell array of each of the first memory plane and the second memory plane that is adjacent to the first word line step region.

3. The memory device of claim 2, wherein the first row decoder array includes a row decoder circuit providing drive signals to word lines of a memory block selected from among a plurality of memory blocks included in the memory cell array that corresponds to the row decoder array.

4. The memory device of claim 2, wherein:
   bit lines of the first partial region of each of the first memory plane and the second memory plane are connected to a first page buffer array, and other bit lines not included in the first partial region are connected to a second page buffer array separated from the first page buffer array in the second horizontal direction, and
   the first page buffer array overlaps a part of the second page buffer array in the first horizontal direction.

5. The memory device of claim 4, wherein the first page buffer array and the second page buffer array each includes a plurality of page buffers arranged in a line in the second horizontal direction.

6. The memory device of claim 5, wherein a number of page buffers arranged in a line in the second horizontal direction in the first page buffer array is greater than a number of page buffers arranged in a line in the second horizontal direction in the second page buffer array.

7. The memory device of claim 5, wherein a number of page buffers arranged in a line in the second horizontal direction in the first page buffer array is less than a number of page buffers arranged in a line in the second horizontal direction in the second page buffer array.

8. The memory device of claim 4, wherein:
   the first page buffer array is in the peripheral circuit structure in a region overlapping the memory cell array of the first memory plane, and
   the second page buffer array overlaps, in the first horizontal direction, a part of a central part of a length in a second horizontal direction of the memory cell array of each of the first memory plane and the second memory plane excluding the first partial region.

9. The memory device of claim 4, wherein:
the first page buffer array is in the peripheral circuit structure in a region overlapping the memory cell array of the first memory plane, and
the second page buffer array is in the peripheral circuit structure in a region overlapping the memory cell array of the second memory plane.

10. The memory device of claim 4, wherein:
the plurality of memory planes further include a third memory plane and a fourth memory plane respectively aligned with the first memory plane and the second memory plane in the first horizontal direction,
a second row decoder array of each of the third memory plane and the fourth memory plane is in the peripheral circuit structure corresponding to lower portions of a second word line step region of each of the third memory plane and the fourth memory plane and a second partial region of the memory cell array adjacent to the second word line step region,
bit lines in the second partial region of each of the second memory plane and the fourth memory plane are connected to a third page buffer array, and other bit lines not included in the second partial region are connected to a fourth page buffer array separated from the third page buffer array in the second horizontal direction,
the fourth page buffer array overlaps, in the first horizontal direction, parts of ta central part of a length of the memory cell array of each of the third memory plane and the fourth memory plane in the second horizontal direction, excluding the second partial region, and
the third page buffer array overlaps a part of the fourth page buffer array in the first horizontal direction.

11. The memory device of claim 10, wherein the first row decoder array of each of the first memory plane and the second memory plane and the second row decoder array of each of the third memory plane and the fourth memory plane are adjacent to a central part of a length of the peripheral circuit structure in the first horizontal direction.

12. The memory device of claim 10, wherein the row decoder array of each of the first memory plane and the second memory plane and the row decoder array of each of the third memory plane and the fourth memory plane are adjacent to outer edges of lengths of the peripheral circuit structure in the first horizontal direction.

13. The memory device of claim 1, wherein:
the cell array structure includes a first metal pad,
the peripheral circuit structure includes a second metal pad,
the peripheral circuit structure is vertically connected to the cell array structure by a bonding method, and
the first metal pad is connected to the second metal pad by the bonding method.

14. The memory device of claim 13, wherein a material of each of the first metal pad and the second metal pad is copper.

15. The memory device of claim 1, wherein:
the cell array structure includes a through-electrode region that includes through-hole vias extending in the vertical direction into the peripheral circuit structure by passing through the plurality of word lines, and
the peripheral circuit structure is vertically connected to the cell array structure through the through-electrode region.

16. The memory device of claim 1, wherein the cell array structure includes at least one chip including the memory cell array.

17. The memory device of claim 16, wherein:
the plurality of memory planes include a first memory plane and a second memory plane adjacent to the first memory plane in the first horizontal direction, and
a first row decoder array of each of the first memory plane and the second memory plane is in a portion of the peripheral circuit structure corresponding to a lower portion of a first word line step region of the second memory plane and a first partial region of the memory cell array of the second memory plane adjacent to the first word line step region.

18. A memory device comprising:
a plurality of memory planes that each include a memory cell array including a plurality of non-volatile memory cells, a row decoder array connected to the plurality of non-volatile memory cells included in the memory cell array through a plurality of word lines extending in a first horizontal direction, and a page buffer array connected to the plurality of non-volatile memory cells included in the memory cell array through a plurality of bit lines extending in a second horizontal direction crossing the first horizontal direction;
a peripheral circuit structure including the row decoder array included in each of the plurality of memory planes and the page buffer array included in each of the plurality of memory planes, the row decoder array being on one edge of the peripheral circuit structure; and
a cell array structure on the peripheral circuit structure, the cell array structure overlapping the peripheral circuit structure in a vertical direction on the peripheral circuit structure, wherein the cell array structure includes the memory cell array of each of the plurality of memory planes, and a word line step region in which the plurality of word lines extend parallel to each other in the first horizontal direction and the second horizontal direction and overlap each other in the vertical direction,
wherein, in each of the plurality of memory planes, the page buffer array is divided into a page buffer array connected to bit lines of a partial region of the memory cell array that overlaps a part of the row decoder array in the vertical direction and a page buffer array connected to other bit lines not included in the partial region.

19. A memory device comprising:
a plurality of memory planes that each include a memory cell array including a plurality of non-volatile memory cells, a row decoder array connected to the plurality of non-volatile memory cells included in the memory cell array through a plurality of word lines extending in a first horizontal direction X, and a page buffer array connected to the plurality of non-volatile memory cells included in the memory cell array through a plurality of bit lines extending in a second horizontal direction Y crossing the first horizontal direction;
a peripheral circuit structure including the row decoder array included in each of the plurality of memory planes and the page buffer array included in each of the plurality of memory planes, the row decoder array being on one edge of the peripheral circuit structure, and the page buffer array being on both sides of the peripheral circuit structure in the second horizontal direction; and
a cell array structure on the peripheral circuit structure, the cell array structure overlapping the peripheral circuit structure in a vertical direction on the peripheral circuit structure, wherein the cell array structure includes the memory cell array of each of the plurality of memory planes, and a word line step region in which the plurality of word lines extend parallel to each other in the first horizontal direction and the second horizontal direction and overlap each other in the vertical direction, wherein, in each of the plurality of memory planes, the page buffer array is divided into a page buffer array connected to bit lines of a partial region of the memory cell array overlapping a part of the row decoder array in the vertical direction and a page buffer array connected to other bit lines not included in the partial region.

20. The memory device of claim 19, wherein:

the plurality of memory planes further include a first memory plane and a second memory plane adjacent to the first memory plane in the second horizontal direction and a third memory plane and a fourth memory plane respectively aligned with the first memory plane and the second memory plane in the first horizontal direction, a first row decoder array of each of the first memory plane and the second memory plane is in a portion of the peripheral circuit structure that overlaps a first word line step region of the second memory plane and a first partial region of the memory cell array of the second memory plane adjacent to the first word line step region, and a second row decoder array of each of the third memory plane and the fourth memory plane is in a portion of the peripheral circuit structure that overlaps a second word line step region of the third memory plane and a second partial region of the memory cell array of the third memory plane adjacent to the second word line step region.

* * * * *